(12) United States Patent
Bui

(10) Patent No.: US 7,877,299 B2
(45) Date of Patent: Jan. 25, 2011

(54) PAYMENT SERVICE CAPABLE OF BEING INVOKED FROM MERCHANT SITES

(75) Inventor: Hong Q. Bui, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 11 days.

(21) Appl. No.: 12/357,211

(22) Filed: Jan. 21, 2009

(65) Prior Publication Data

US 2009/0157531 A1 Jun. 18, 2009

Related U.S. Application Data

(63) Continuation of application No. 09/457,839, filed on Dec. 9, 1999.

(51) Int. Cl.
G06F 17/30 (2006.01)
(52) U.S. Cl. .................. 705/27; 705/64; 705/36 R; 705/26; 709/203; 713/170; 726/6; 715/205
(58) Field of Classification Search .............. 705/26; 713/170; 726/6
See application file for complete search history.

(56) References Cited

U.S. PATENT DOCUMENTS

| | | | |
|---|---|---|---|
| 5,715,314 A | 2/1998 | Payne et al. | |
| 5,815,665 A | 9/1998 | Teper et al. | |
| 5,890,137 A | 3/1999 | Koreeda | |
| 5,903,652 A | 5/1999 | Mital | |
| 5,903,721 A | 5/1999 | Sixtus | |
| 5,903,878 A | 5/1999 | Talati et al. | |
| 5,956,483 A * | 9/1999 | Grate et al. | 709/203 |
| 6,005,939 A | 12/1999 | Fortenberry et al. | |
| 6,070,142 A | 5/2000 | McDonough et al. | |
| 6,078,902 A | 6/2000 | Schenkler | |
| 6,092,053 A | 7/2000 | Boesch et al. | |
| 6,092,196 A * | 7/2000 | Reiche | 726/6 |
| 6,275,824 B1 | 8/2001 | O'Flaherty et al. | |
| 6,327,578 B1 | 12/2001 | Linehan | |
| 6,332,134 B1 * | 12/2001 | Foster | 705/36 R |
| 6,601,761 B1 | 8/2003 | Katis | |
| 6,957,334 B1 * | 10/2005 | Goldstein et al. | 713/170 |
| 7,194,437 B1 | 3/2007 | Britto et al. | |
| 7,685,067 B1 | 3/2010 | Britto et al. | |
| 2005/0216421 A1 * | 9/2005 | Barry et al. | 705/64 |

OTHER PUBLICATIONS

InstaBuy From Cybercash Offers Easy and Safe Buying Solution to Online Consumers and Merchants—InstaBuy Press Release Aug. 19, 1998; printed from www.instabuy.com on Sep. 2, 1999.

(Continued)

*Primary Examiner*—Vanel Frenel
(74) *Attorney, Agent, or Firm*—Knobbe, Martens, Olson & Bear, LLP

(57) ABSTRACT

A computer-implemented service acts as an intermediary between merchant sites and users thereof, and enables the users to purchase items on the merchant sites without having to create accounts with such sites. A user may invoke the service from a web page of a merchant site, and complete a purchase transaction, without having to browse away from the merchant site. The service may either forward the user's payment information to the merchant's system to enable the merchant to charge the customer, or may charge the user on behalf of the merchant. In some implementations, the service enables users to make single-action purchases from the merchant sites.

21 Claims, 28 Drawing Sheets

OTHER PUBLICATIONS

Cybercash Unveils "Instabuy.com," Web Site for Consumer One-Click Shopping Online—InstaBuy Press Release, Feb. 22, 1999; printed from www.instabuy.com on Sep. 2, 1999.

InstaBuy Merchant FAQ—Printed from www.instabuy.com on Sep. 2, 1999.

Understanding InstaBuy A consumer and Merchant Overview—PDF document downloaded from www.instabuy.com on Sep. 2, 1999.

The InstaBuy Consumer Experience—PDF document downloaded from www.instabuy.com on Sep. 2, 1999.

Digital Wallets Project Home Page—Printed from www-db.stanford.edu on Sep. 2, 1999.

Quick Study: Digital Wallets—Printed from www.computerworld.com/home/features.nsf/all/990705qs on Sep. 2, 1999.

A Tale of Two One-Click Initiatives—Printed from www.zdnet.com on Sep. 2, 1999.

Amazon.com About 1-Click and Gift Click Ordering—Printed from www.amazon.com on Dec. 9, 1999.

Sharing Your Data Can Get You Discounts—Printed from San Jose Mercury News web site on Oct. 11, 1999.

Foster, Chuck; U.S. Appl. No. 60/162,651, filed Nov. 1, 1999.

\* cited by examiner

MERCHANT.COM

Checkout Page

Your Order:

3 of item #12345 at $1 each totaling $3
2 of item #23456 at $2 each totaling $4
1 of item #34567 at $3 each totaling $3

Total order: $10

| Enter Payment Information Manually |

Amazon Wallet Holders:

Please enter your Amazon Wallet User ID and

Please enter your Amazon Wallet Password

Click here to make this purchase using your Amazon Wallet
| Purchase |

*FIG. 4B* amazonwallet.com

Amazon Wallet New User Page

Please enter a desired User ID (we recommend your e-mail address):

Please enter a password:

Important Security Note: In order to maintain the security of your customer information, you should only submit your User ID and password to the AmazonWallet.com web site. Participating merchants should refer you to a page on this web site and should not ask you to enter your User ID and password directly to their site. Any offending merchant should be considered suspect and should be reported.

Please enter your name:

Please enter your shipping address:

Please enter a contact phone number:

Please enter your credit card number and expiration date:
MM/YY

Please enter the name exactly as shown on the credit card, if different from your name as entered above:

If the billing address of the credit card is different than the shipping address, please enter the billing address of the credit card:

[ Submit ] [ Reset ]

*FIG. 7A*

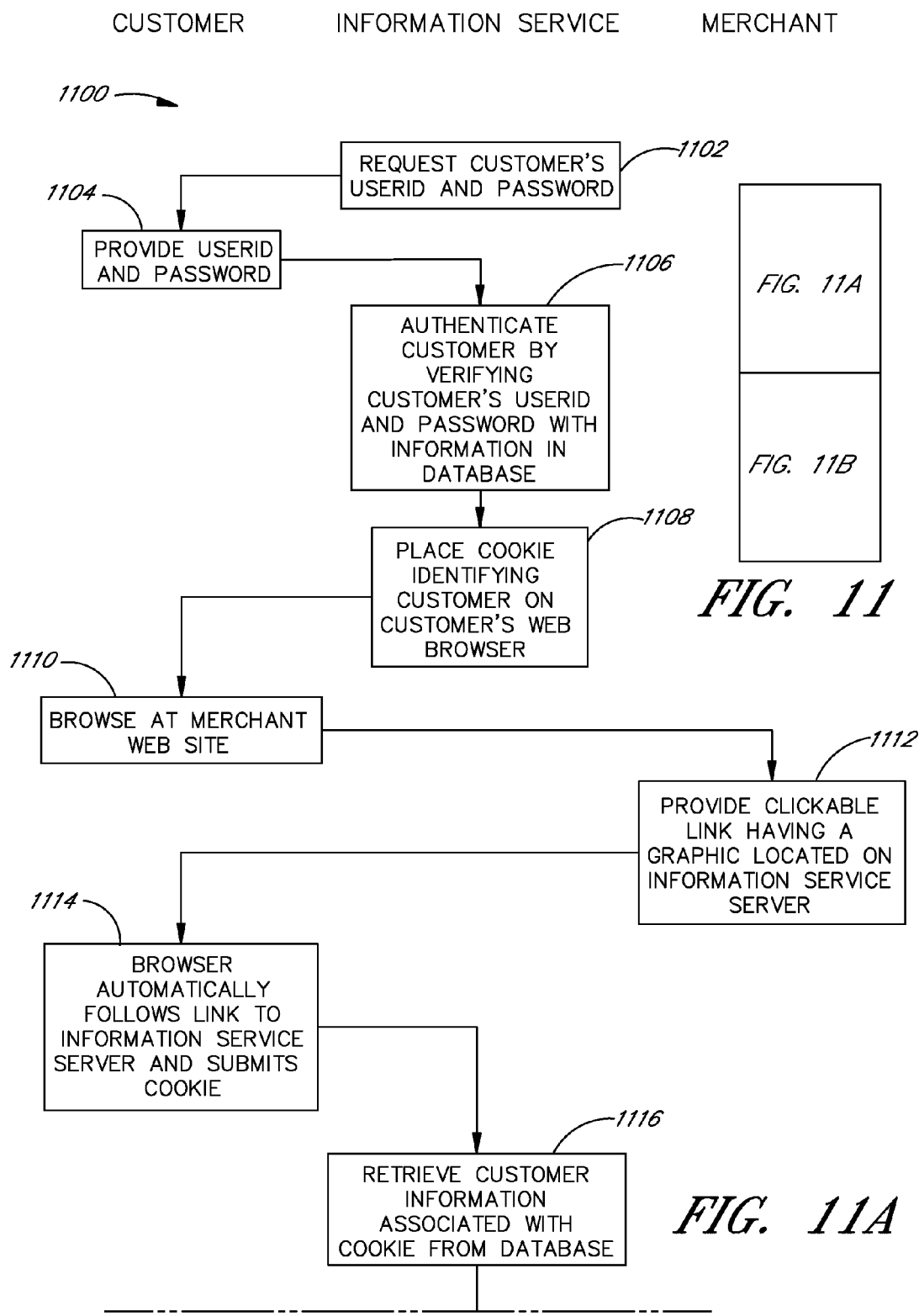

PAYMENT SERVICE CAPABLE OF BEING INVOKED FROM MERCHANT SITES

PRIORITY CLAIM

This application is a continuation of U.S. application Ser. No. 9/457,839, filed Dec. 9, 1999.

BACKGROUND OF THE INVENTION

1. Field of the Invention

This invention relates generally to computer-implemented services for enabling users to conduct purchase transactions on third party merchant sites.

2. Description of the Related Art

Consumers today routinely shop and make purchases of products and services over the Internet using web browsers. Numerous Internet merchants have set up web sites allowing customers to browse through descriptions of products and services. After the customer has selected one or more products for purchase, Internet merchants typically provide the customer with a checkout page requesting payment information from the customer. The payment information usually comprises a credit card number, expiration date, cardholder name, and any other information that may be required to authorize a charge against the customer's card. If applicable, shipping information may also be requested on the checkout page.

It is often considered an inconvenience for a customer to have to enter in the often lengthy amount of information required to process a credit card transaction each time the customer makes a purchase. As a consequence, a number of merchants allow the customer to select a user ID and a password when providing payment and/or delivery information. The merchant catalogs the customer's information and associates it with the user ID and password. In this manner the customer only needs to enter in her user ID and password in order to make subsequent purchases. Customers typically, however, make purchases from more than one merchant. Different merchants may have different formats for a user ID and a password. Furthermore, a customer's preferred user ID may already be in use by another customer at a particular merchant. Consequently, a customer will likely have to remember several user IDs and/or passwords.

Another solution to the inconvenience of filling out lengthy forms, called a wallet or digital wallet, has been suggested. A digital wallet typically comprises a small software layer that functions in conjunction with a web browser on the customer's computer. The wallet stores customer payment and/or delivery information on the customer's computer and provides the information to merchants using a standardized protocol upon the direction of the customer. Many customers, however, consider the process of downloading, installing, and configuring the wallet software too complicated, time consuming or burdensome.

Another advance is the advent by Amazon.com of 1-Click™ shopping. With this feature, the user initially specifies a credit card, shipping address, shipping method, and/or other default information to be used for 1-Click purchases, and can thereafter purchase items with a single mouse click. The 1-Click feature involves placing an identifying cookie on the customer's computer. The customer's web browser returns the cookie to Amazon.com's web server when the web site is accessed. The web server can then read the cookie to identify the customer and present to the customer a web page with the option of purchasing a product with a single click using the information already on file. Additional details of the 1-Click feature are set forth in U.S. Pat. No. 5,960,411, the disclosure of which is hereby incorporated by reference.

Other solutions (see, e.g. U.S. Pat. Nos. 5,715,314 and 5,815,665) involve the use of a third party payment or brokering service. The customer first registers with the payment or brokering service. The payment or brokering service can then authenticate the customer during subsequent transactions with merchants. The payment or brokering service bills the customer for each authorized transaction and provides payments to the merchants.

BRIEF DESCRIPTION OF THE DRAWINGS

Referring now to the drawings in which like reference numbers represent corresponding components throughout:

FIGS. 4A-G illustrate a number of example web pages that are displayed to a customer in accordance with a first specific embodiment of the present invention;

FIGS. 7A-E illustrate a number of example web pages that are displayed to a customer in accordance with a second specific embodiment of the present invention;

FIGS. 11A-B are a flowchart illustrating a process through which customer information is provided to a merchant in accordance with the third specific embodiment.

DETAILED DESCRIPTION OF THE PREFERRED EMBODIMENTS

In the following description, reference is made to the accompanying drawings, which show, by way of illustration, specific embodiments in which the invention may be practiced. Numerous specific details of these embodiments are set forth in order to provide a thorough understanding of the present invention. However, it will be obvious to one skilled in the art that the present invention may be practiced without the specific details or with certain alternative components and methods to those described herein. In other instances, well-known methods, procedures, and components have not been described in detail so as not to unnecessarily obscure aspects of the present invention.

I. System Components

Figure 1:
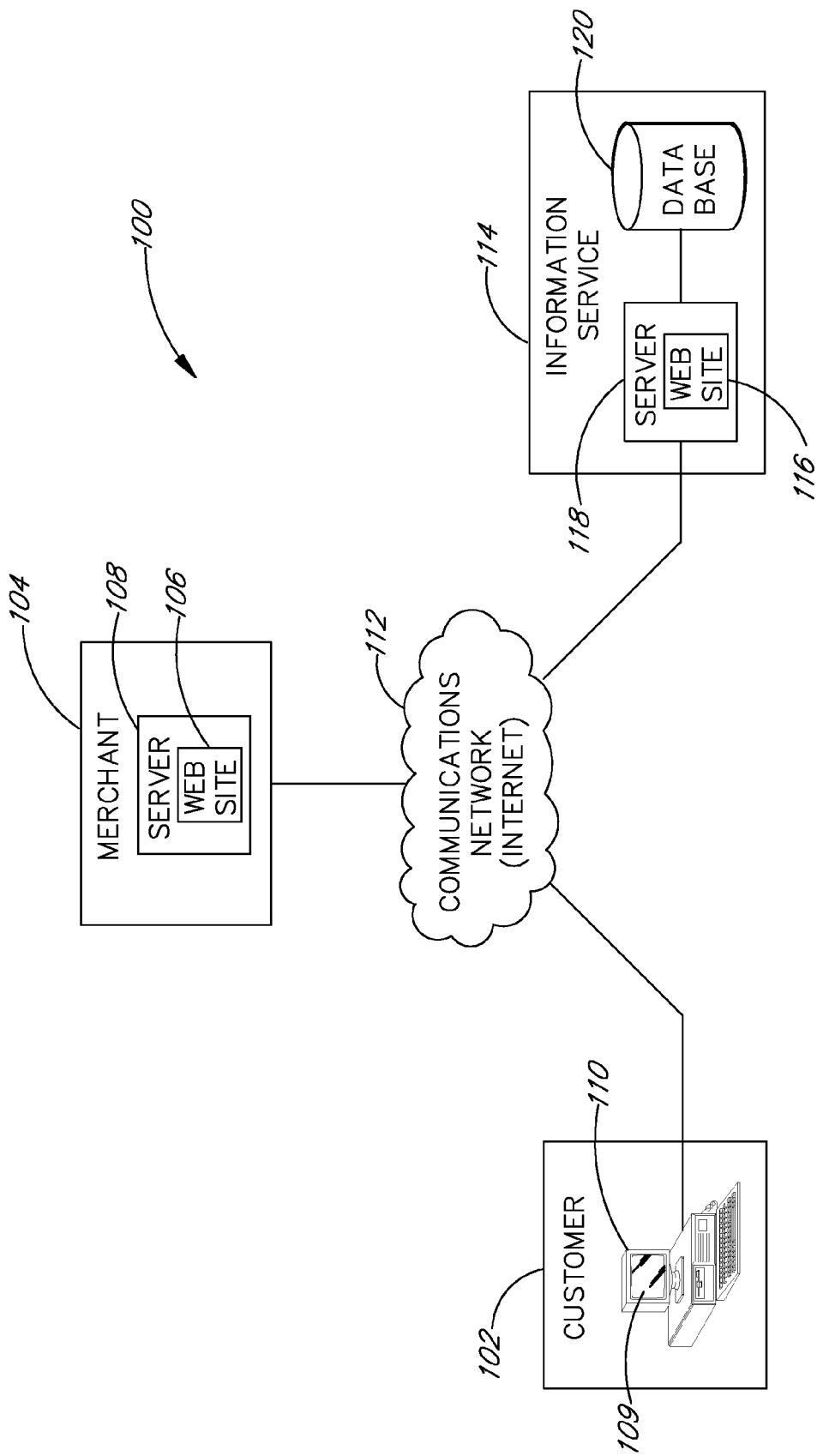
FIG. 1 illustrates the principal components of a preferred embodiment of a customer authentication and data transfer system.

FIG. 1 illustrates the principal components of a preferred embodiment of a customer authentication and data transfer system 100. A customer 102 can be any entity or individual that wishes to make purchases of products or services from a merchant 104. The merchant 104 is preferably an entity that sells products or services from a merchant web site 106, which is implemented using one or more physical servers 108. In order to select and purchase products or services, the customer 102 preferably uses a web browser 109 running on a computer 110. The computer 110 is connected to the merchant server 108 through a communications network 112, which is preferably the Internet.

In order to make purchases, the customer 102 typically provides various types of customer information to merchants 104. The customer information may include, for example, the customer's name, shipping address(es), email address, payment information, 1-Click settings, and the names and addresses of common gift recipients. The customer may also be required to provide authentication information, such as a user ID (which may be the user's email address) and password. The merchant 104 may also collect and store various other types of customer information, including purchase histories and other data that indicates customers' interests.

The information service 114 is an entity that serves as an intermediary for providing customer information to the merchant 104 in a secure and convenient manner through the communications network 112. The customer 102, using the computer 110, interacts with the information service 114 through an information service web site 116 that is serviced by an information service server 118. The information service server 118 prompts the user to enter various types of customer information and authentication information and stores and associates this information in a database 120. The information service 114, through its server 118 and database 120, authenticates the customer 102 using the authentication information, and electronically provides some or all of the customer's information to the merchant 104 and possibly other merchants. For purposes of the following description, the terms "customer information" and "customer's information" will be used to refer primarily to information other than the authentication information (user ID and password).

In the context of the present disclosure, actions indicated as being taken by the customer 102 are preferably performed by or through, as applicable, the web browser 109 and/or the computer 110. Actions indicated as being taken by the merchant 104 are preferably performed by or through, as applicable, the merchant server 108 and its associated software components. Actions indicated as being taken by the information service 114 are preferably performed by or through, as applicable, the information service server 114 and its associated software components. The computers and servers referenced herein are preferably general-purpose computers, although application-specific hardware could be used to perform certain tasks.

In one preferred embodiment, the information service 114 is also an Internet merchant, separate and different from the merchant 104. Accordingly, the information service 114 typically will have available to it an existing database of customer information acquired as an Internet merchant. Existing customers of the information service 114 (as an Internet merchant) will preferably be able to use the customer authentication and data transfer system 100, without an additional registration, to make purchases from merchants 104 other than the information service 114. For example, Amazon.com, acting as an information service 114, can provide its customers the option to shop from web sites of other merchants (e.g. www.gap.com) using their Amazon.com user IDs and passwords. Although the information service 114 is preferably an Internet merchant, it may alternatively be a non-merchant entity.

II. General Embodiment

A general embodiment of the invention will now be described with reference to FIGS. 2A-B and FIG. 3. This general embodiment is intended to illustrate the basic operation of the customer authentication and data transfer system 100. The three following sections will describe three specific embodiments based upon the general embodiment presented in this section.

A. Methods and Data Flows

Figure 2A:
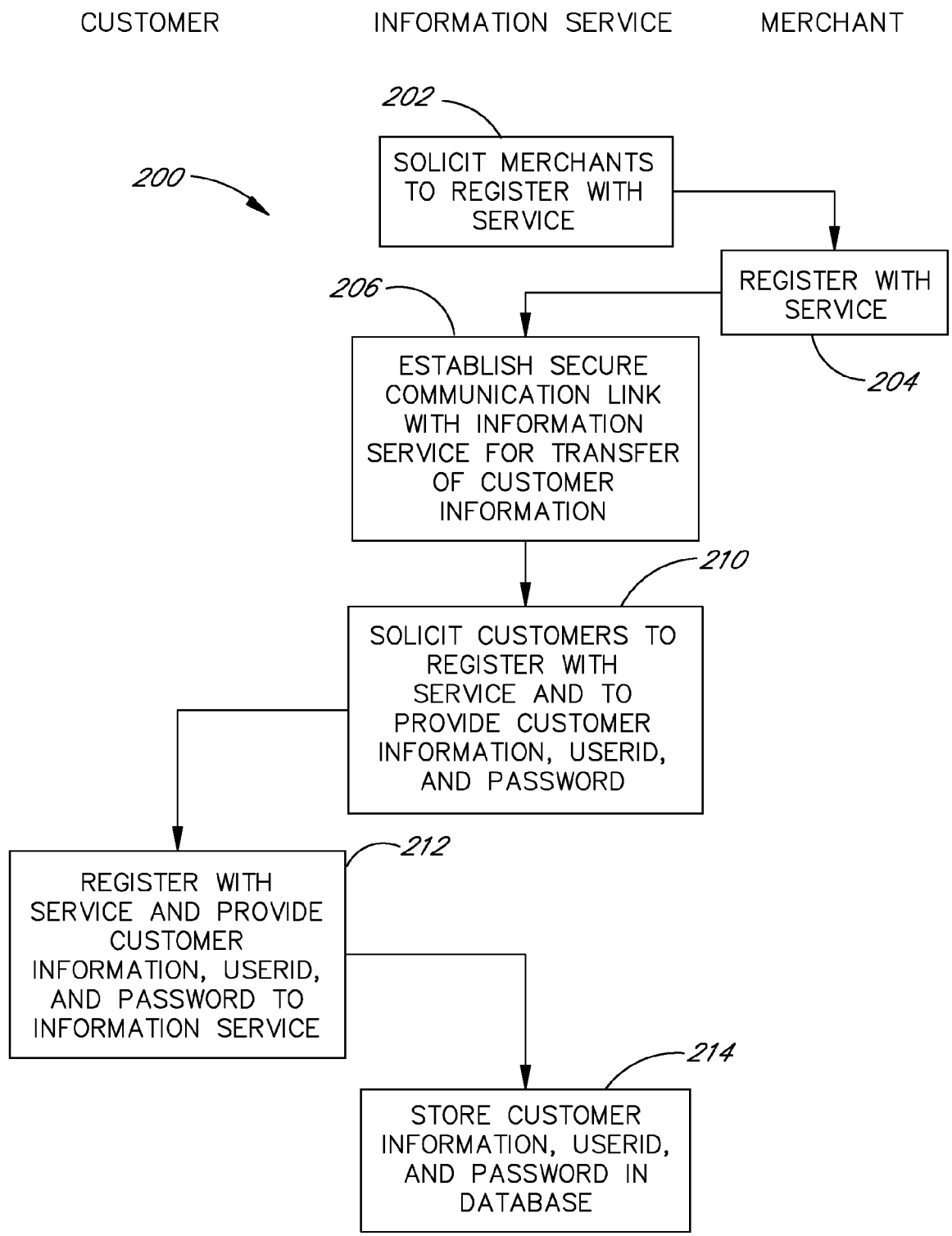
FIGS. 2A-B are two flowcharts illustrating a general embodiment of the system.
Figure 2B:
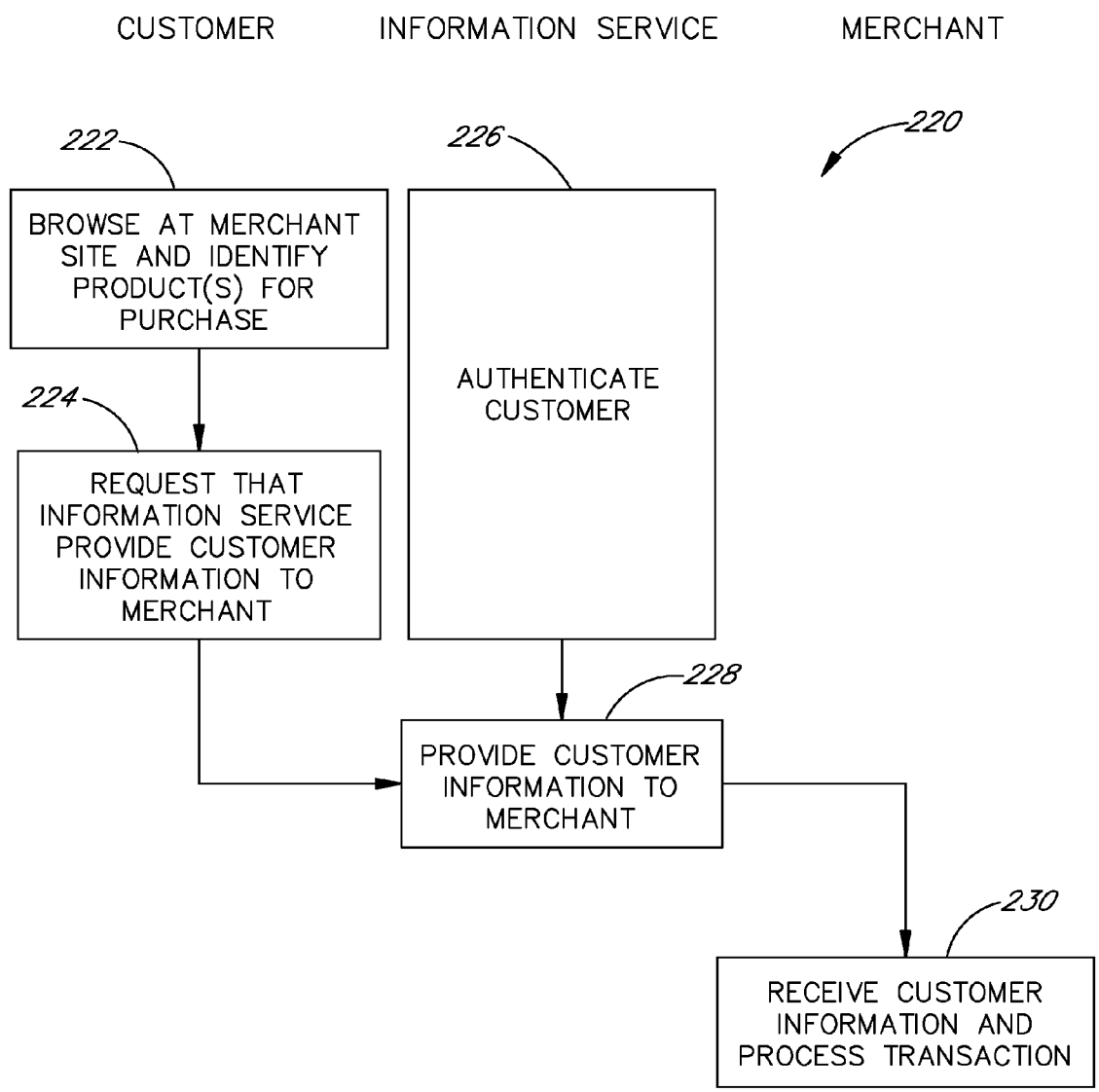

FIGS. 2A-B are two flowcharts 200, 220 illustrating the operation of the general embodiment of the system 100. The flowcharts 200, 220 are presented in a three column format wherein the actions performed by each of the customer 102, the information service 114, and the merchant 104 are depicted in a respective column under the name of the acting entity. The remaining flowcharts in this disclosure also follow the same format.

Figure 3:
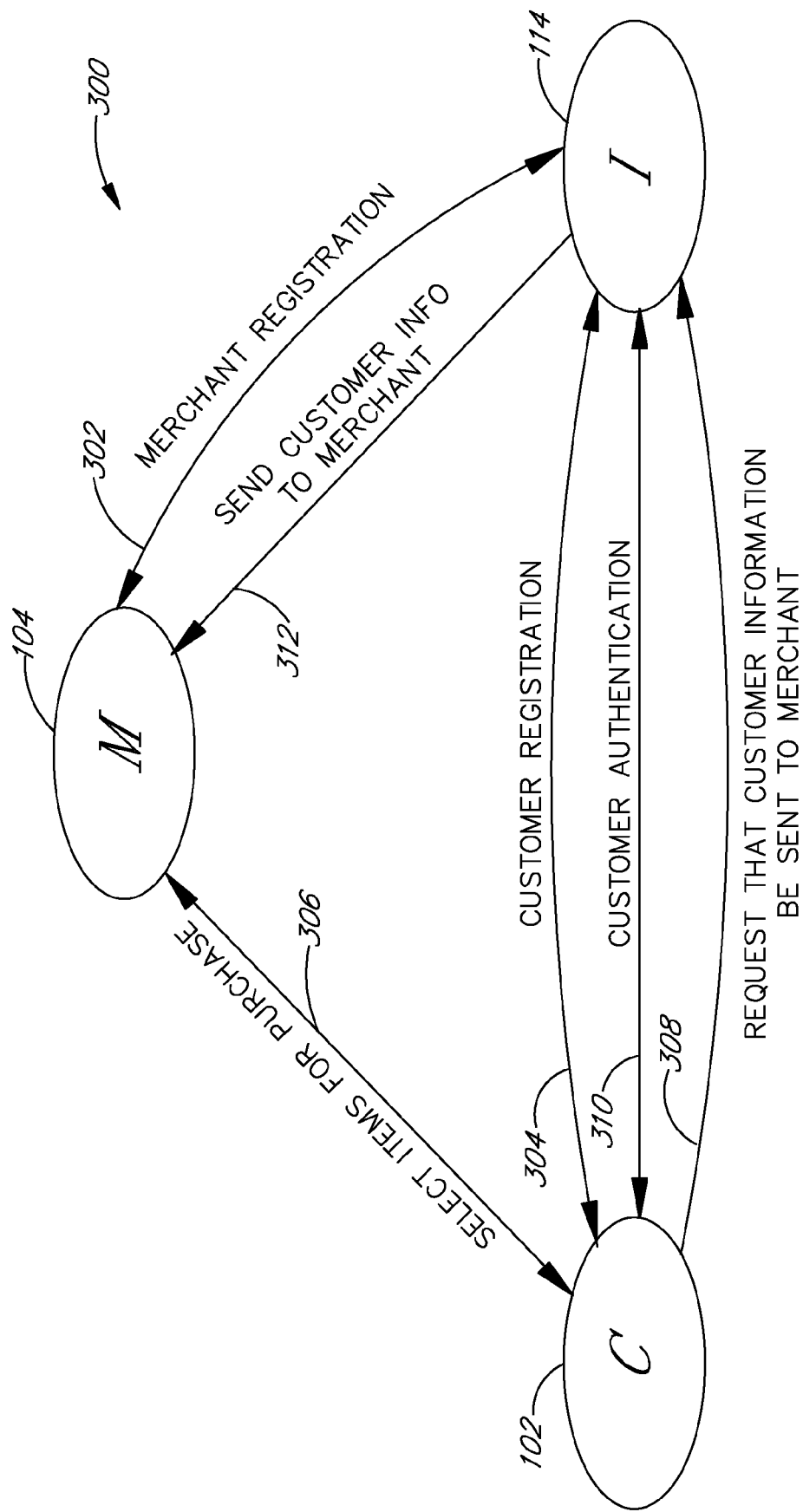
FIG. 3 illustrates a data flow diagram showing the transfer of information between a customer, an information service, and a merchant in accordance with the general embodiment of FIGS. 2A-B.

FIG. 3 illustrates a data flow diagram 300 showing the transfer of information between the customer 102, the information service 114, and the merchant 104 in accordance with the general embodiment. Information sent between the customer 102, the information service 114, and the merchant 104 is preferably sent through the computer 110, the information service server 118, or the merchant server 108 over the communications network 112. In the alternative, the information service 114 could communicate with the merchant 104 over a separate communications network 112 other than the one used between the information service 114 and the customer 102. For example, the transfer of customer information from the information provider 114 to the merchant 104 could occur over a direct dial telephone connection.

In steps 202-206 of the flowchart 200 in FIG. 2A a merchant 114 registers to use the authentication and data transfer system 100. At a first step 202, the information service 114 solicits merchants to register to use the system 100. The solicitation can be accomplished through Internet advertising, e-mail, or any off-line forms of solicitation typically used by businesses. At a next step 204, a merchant registers with the information service 114. The registration can be performed on-line, through the information service web site 116, or off-line, through conventional means. At step 204, the identity of the merchant and its server information are preferably stored in the information service's database 120. At a next step 206, the information service 114 and the merchant 104 establish a secure communications link over the communications network 112 through which customer information and other information can be transferred. Step 206 may involve the installation and configuration of software on the merchant server 114. Steps 202-206 are generally depicted in the data flow diagram 300 (FIG. 3) by the two-way link 302 between the information service 114 and the merchant 104, titled "Merchant Registration."

The process of registering merchants as in steps 202-206 is suggested primarily to improve the security aspects of the present invention, but is not essential to its operation. By registering the merchant 104, the information service 114 can request information sufficient to verify that the merchant 104 is a valid business concern. In this manner, the information service 114 can, by one method, avoid inadvertently providing sensitive information to illegitimate entities. In alternative embodiments, steps 202-206 could be omitted.

In steps 210-214 of the flowchart 200 a customer 102 registers to use the authentication and data transfer system 100. In the illustrated example, steps 202-206 occur before steps 210-214, however, steps 210-214 could occur before or at the same time as steps 202-206. At step 210, the information service 114 solicits customers to register with the service and to provide customer information, a user ID, and a password. The solicitation may be accomplished either on-line on the Internet or through conventional means. At step 212, the customer 102 registers with the information service 114 and provides customer information, a user ID, and a password. This registration is preferably performed through the information service web site 116 and may be performed in conjunction with a purchase made from the information service 114. At a next step 214, the information service 114 associates and stores the customer information, the user ID, and the password in the database 120. Steps 210-214 are generally depicted in the data flow diagram 300 by the two-way link 304 between the customer 102 and the information service 114 titled "Customer Registration." Many merchants 104 and many customers 102 will typically register with the information service 114.

Referring now to the flowchart 220 in FIG. 2B, the customer 102 browses at the merchant web site 106 and identifies product(s) and/or service(s) for purchase at step 222. The exchange of web pages and selections by the customer 102 and merchant 104 are indicated by the two-way link 306 in the data flow diagram 300. In an alternative embodiment, the customer information may be transferred to the merchant 104 without requiring the customer 102 to make a purchase. At a next step 224 of the flowchart 220, the customer 102 requests (implicitly or explicitly) that the information service 114 provide the customer information to the merchant 104. The request of step 224 is indicated by the one-way link 308 from the customer 102 to the information service 114 in the data flow diagram 300. The request 308 results from a particular action by the customer 102, such as a clicking on a "transfer information" link on the information service web site 116 or a clicking on a "purchase" link on the merchant web site 106.

At step 226, the information service 114 authenticates the customer 102, preferably by requesting that the customer 102 provide the user ID and password. Step 226 is depicted by a larger block that extends above and below steps 222 and 224 to emphasize that the authentication step need not occur at a specific time relative to steps 222 and 224. Although other steps are shown throughout the drawings in a particular order, it will be recognized that the order can be varied in many instances. The authentication of step 226 is indicated by the two-way link 310 between the customer 102 and the information service 114 in the data flow diagram 300. Once steps 224 and 226 have been completed, the information service 114 provides some or all of the customer's information to the merchant 104 at step 228. The transfer of the customer information of step 228 is indicated by the one-way link 312 from the information service 114 to the merchant 104 in the data flow diagram 300. At step 230, the merchant 104 receives the transferred customer information and processes the transaction.

In the preferred embodiment, the user ID is the e-mail address of customer 102, and the password is a secret code selected by the customer 102. The customer information transferred to the merchant preferably includes payment and delivery information, such as, for example, a customer name, a credit card number, a credit card expiration date, a billing address, and a delivery address. The transferred customer information may also include, for example, a preferred shipment method, the customer's 1-Click settings, and the names and addresses of gift recipients. The transferred information may also include the customer's purchase history (optionally including items purchased from other merchants) and "interests" profile (specified explicitly by the customer or derived from the customer's activities) and other types of information that may be used by the merchant 104 to generate personal purchase recommendations or otherwise customize the merchant web site 106. In implementations in which the merchants store the transferred information for subsequent use, the customer's user ID and password may also be transferred, or may be captured by the merchant during authentication of the customer.

Further, specific types of customer information provided to a merchant by the information service 114 may be dependent upon the merchant's type of business. For example, when the customer 102 shops at a web site of a sporting goods merchant, the information service 114 may expose to the sporting goods merchant all prior purchases or interests falling within the "sports" category. The sporting goods merchant could then use this information to customize the web site for the customer 102. When the customer sets up an account with an online stock trading firm, the transferred customer information may include a social security number or a bank account number.

The information service web site may present the customer an option to specify or restrict the customer information that is transferred, and/or an option to specify the merchants 102 to which the customer information is transferred.

B. Security

A number of the transactions involved in the above-described embodiment would pose security risks if transacted over an insecure communications link. Step 212, for example, wherein the customer provides sensitive information is preferably conducted using encryption to provide a secure and private communication link. In the context of the present invention, communications of sensitive information, such as a user ID, a password, or customer information are preferably effectuated over secure communications links.

A number methods and protocols for providing secure communication links are presently available and well known in the art. Applicable methods and protocols include asymmetric key encryption (public-private key encryption), symmetric key encryption, and SSL (Secure Sockets Layer). A secure communications link can also be established using a direct connection through a separate or secure communications network, such as, for example, a direct connection between the information service 114 and the merchant 104.

C. Communications Protocol

In the preferred embodiment, the customer 102, the merchant 104, and the information service 114 communicate using the hypertext transfer protocol (hereinafter HTTP). HTTP is the principal protocol that web browsers use to communicate with web servers over the Internet. When a web browser follows a hypertext link on a web page, the browser is said to generate an HTTP request. Associated with each HTTP request is the uniform resource locator or URL of the hypertext link. The HTTP request is serviced by a server that handles the URLs within the domain of the server. As HTTP and its related concepts are well known in the art, they will not be discussed in further detail herein. It will be noted that while the use of HTTP is suggested in the preferred embodiment, other communications protocols could be used.

III. First Specific Embodiment

In a first specific embodiment of the present invention, an Internet merchant 104 displays a form, preferably on a checkout page on the merchant web site 106, requesting the entry of a customer's user ID and password. The Internet merchant 104 then submits the entered user ID and password to the information service 114. The information service 114 in turn returns to the merchant 104 the customer information associated with the user ID and password, or returns an error message if the user ID/password pair is invalid. The merchant then presents to the customer 102 an order confirmation page that allows the customer 102 to confirm the sale. Once the customer 102 has confirmed the sale, the merchant 104 uses the customer information to process a payment and, if applicable, ship the order.

In the first subsection below, a set of example web pages illustrates the present embodiment from the perspective of the customer 102. In a next subsection, a flowchart and data flow diagram illustrate the present embodiment from an implementation perspective. In a third subsection, a number of alternative implementations of the embodiment are described.

A. Example Web Pages FIGS. 4A-G illustrate a number of example web pages that are displayed to a customer 102 in accordance with the first specific embodiment of the present invention. In the illustrated example, Merchant.com, a hypothetical merchant, serves as the Internet merchant 104, and Amazonwallet.com serves as the hypothetical information service 114. In the context of these web pages, "Amazon Wallet" represents the name of a service, provided by the present embodiment, that a customer 102 uses to make purchases from multiple Internet merchants using only a single user ID and password set.

Figure 4A:
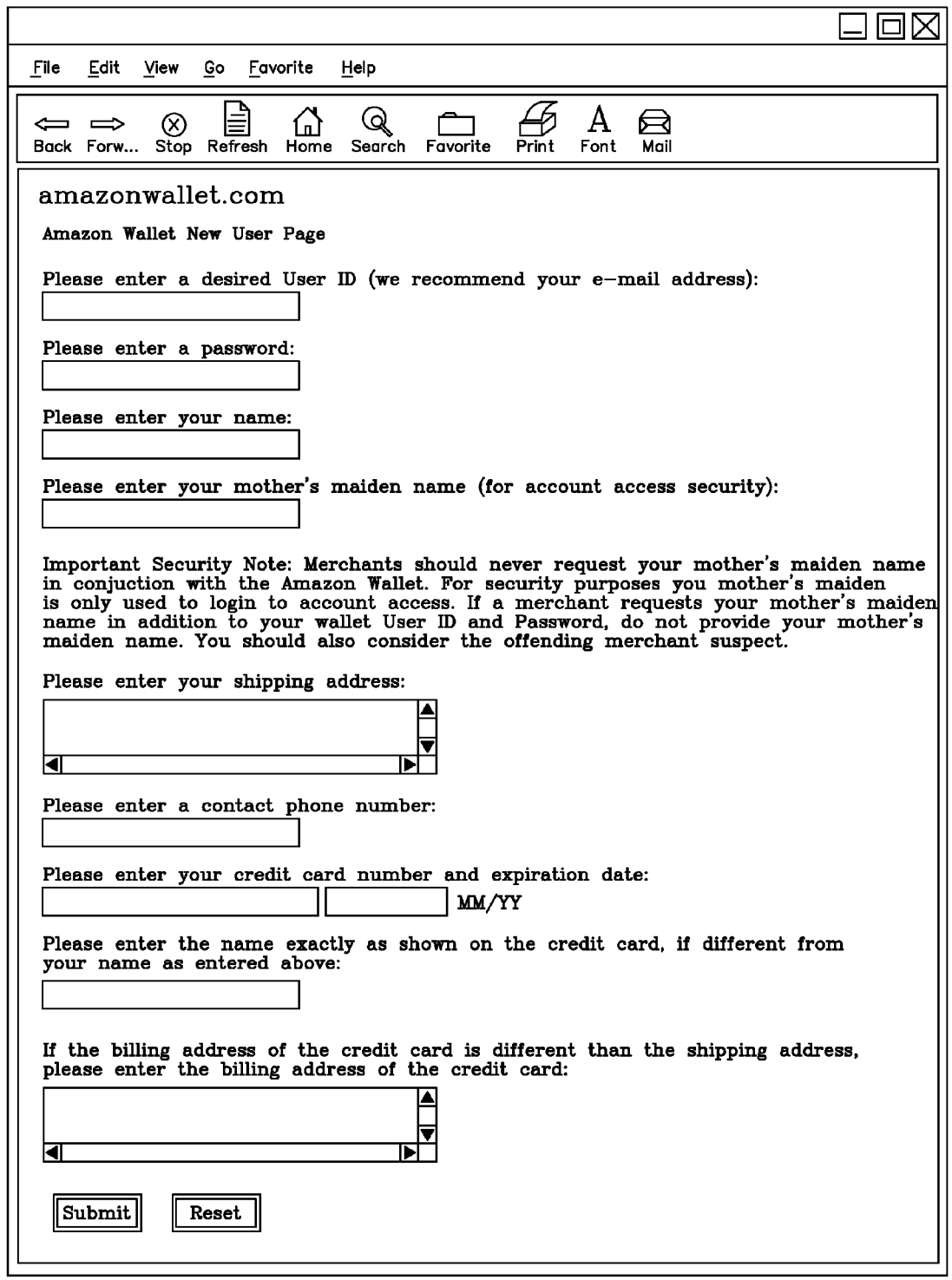

FIG. 4A illustrates an Amazon Wallet New User Page of the Amazonwallet.com web site 116. The page has form entry fields for a user ID, a password, and customer information such as a shipping address, a contact phone number, and payment information. In the illustrated embodiment, the payment information comprises a credit card number, the credit card expiration date, the name displayed on the card, and the billing address of the card. As will be discussed in further detail below, the customer's mother's maiden name is also preferably requested in order to maintain the security of the information submitted. Once a new customer 102 fills in the new user information and submits the form, the customer 102 can then use the wallet to shop at the web sites of Internet merchants that have registered with the information service 114.

If the customer 102 is already an existing customer of Amazon.com, which operates Amazonwallet.com in this example, the process of filling in the new user information may be bypassed. In this case, the customer information already on file with Amazon.com could be used to make the Amazon Wallet automatically active.

FIG. 4B illustrates a Checkout Page of the Merchant web site 106 that a customer 102 reaches after selecting one or more products and/or services for purchase. The Checkout Page lists the order and presents to the customer 102 an option to enter payment and possibly delivery information manually or to use the Amazon Wallet. If the customer 102 chooses to use the Amazon Wallet, the customer 102 enters her user ID and password and clicks on the associated button.

Figure 4C:
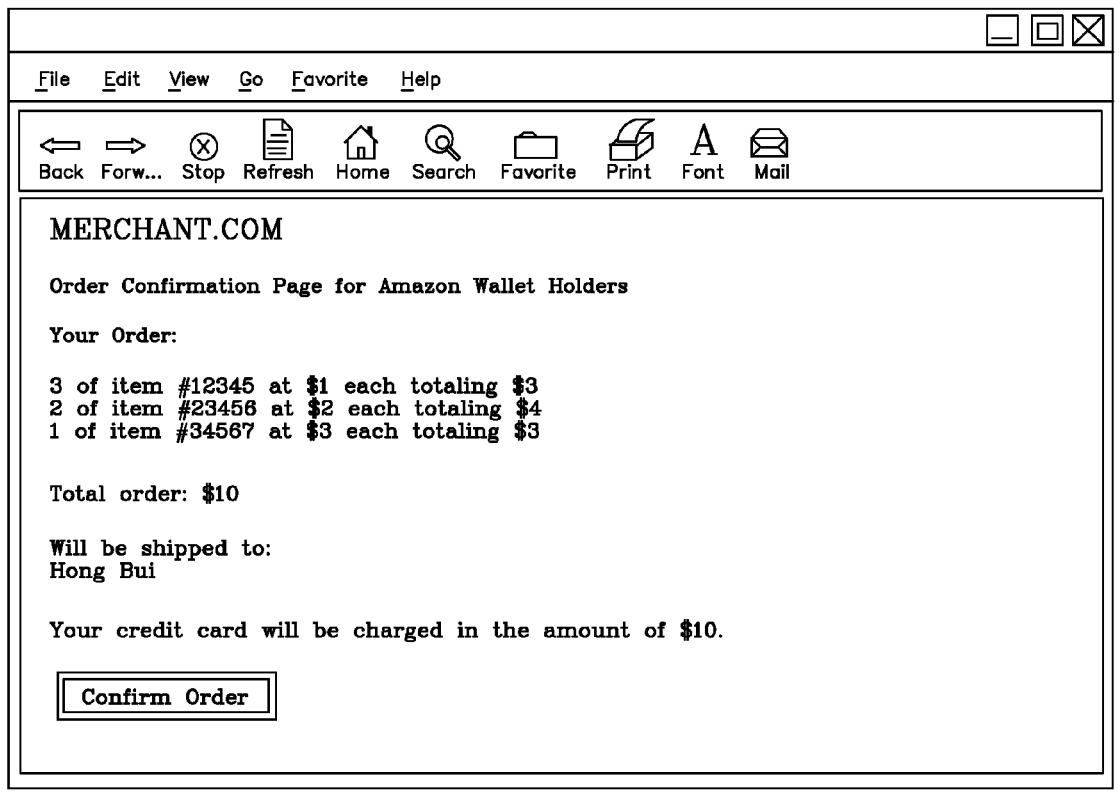
Figure 4D:
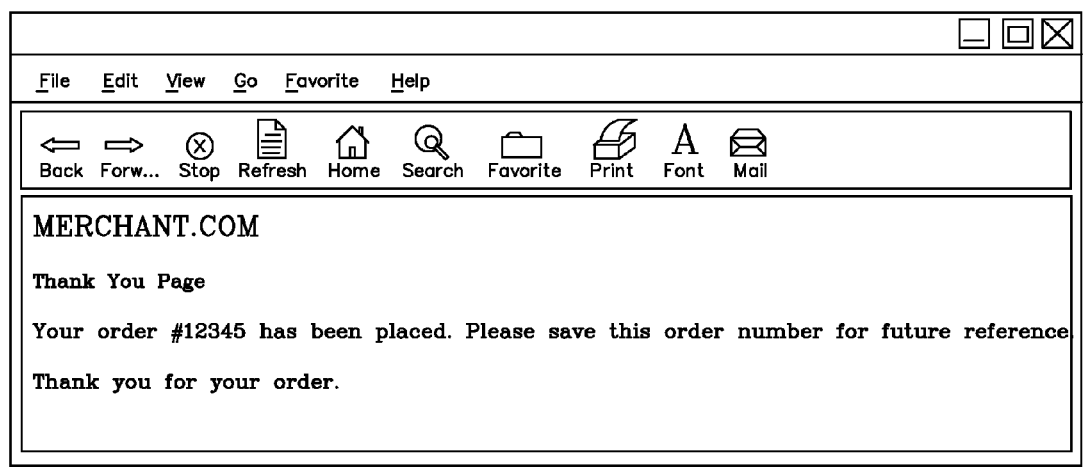

FIG. 4C illustrates an Order Confirmation Page that is next displayed to the Amazon Wallet customer 102 on the Merchant.com web site 106. The page again lists the order, the name of the customer 102 in order to confirm the identity of the customer, and displays a "confirm order" button. The Amazon Wallet customer 102 next sees a ThankYou page on the Merchant.com web site 106 as illustrated in FIG. 4D. The page confirms that the order has been placed, provides an order number for order tracking, and thanks the customer 102.

Figure 4E:
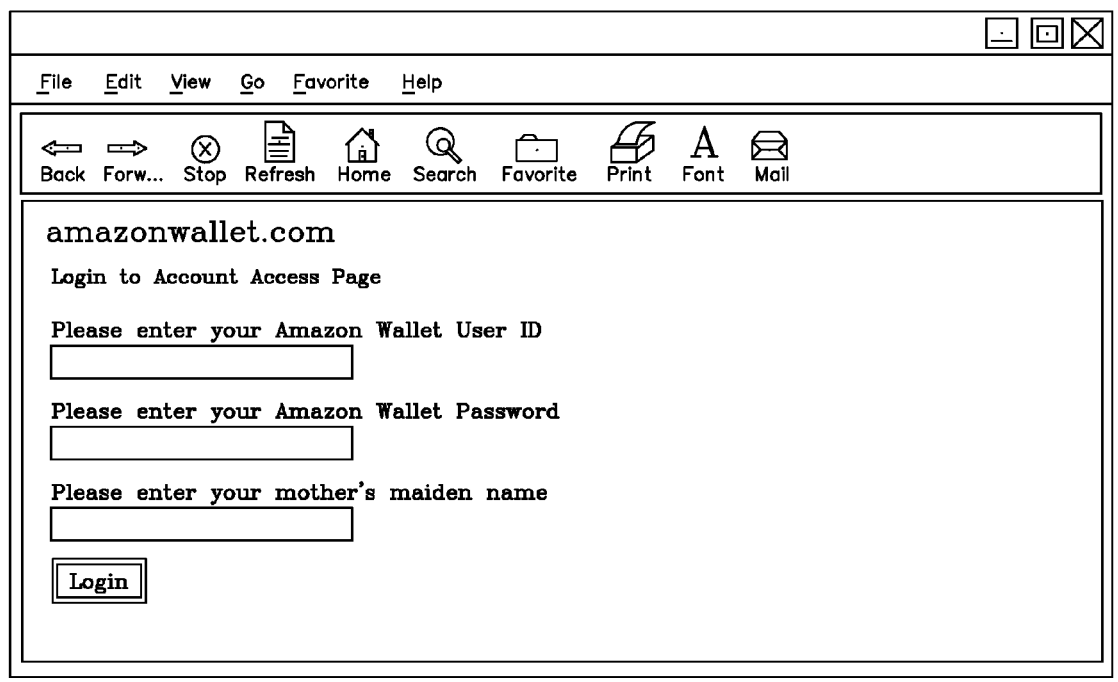

FIG. 4E illustrates an Amazonwallet.com Login to Account Access Page of the Amazonwallet.com web site 116. This page serves as a gateway to the customer's access to her own customer information. In addition to the Amazon Wallet user ID, and password, the page also requests that the customer 102 enter her mother's maiden name.

The maiden name of the customer 102 is requested in order to close security loopholes by only requesting the customer ID and password. A simple example will serve to illustrate one such security loophole. Suppose that only the user ID and customer password were required to gain access to the customer information. These two pieces of information are the same that are requested by other Internet merchants. Suppose an illegitimate entity posing as an Internet merchant posted a web site and purported to service Amazon Wallet customers 102. The illegitimate entity could solicit Amazon Wallet customers 102 to enter their user IDs, and passwords. Supposing the Amazon Wallet Account Access Page did not require an additional element of information such as a mother's maiden name, the illegitimate entity could use the user IDs and passwords acquired from unsuspecting customers 102 to access and/or change confidential customer information on the Amazon Wallet web site. By requiring customers 102 to provide an extra element of information to gain access to their own information, the danger of this loophole is drastically reduced. This feature also prevents a registered merchant 104 from fraudulently modifying a customer's information on file with Amazonwallet.com.

Figure 4F:
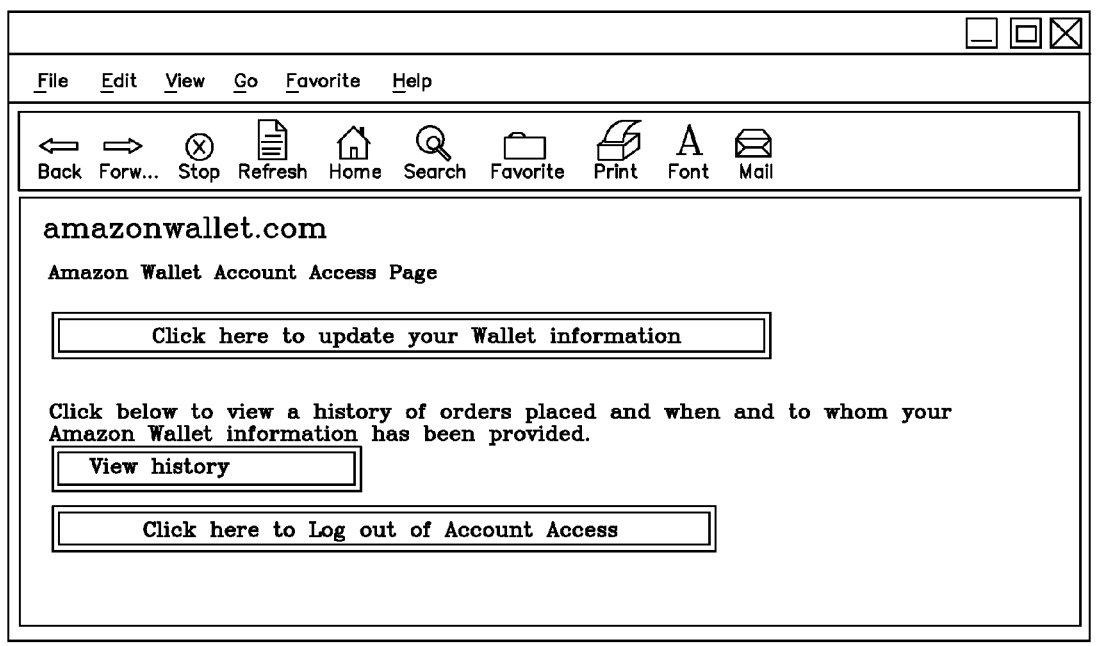

FIG. 4F illustrates the Amazon Wallet Account Access Page of the Amazonwallet.com web site 116, which is reached by customers 102 after the Login Page. This page allows Wallet customers 102 to view and update the Wallet account information by clicking on a button. The button leads to an Update Page (not illustrated) that is similar in layout to the New User Page, but preferably has the information fields already filled in. The customer 102 can modify information as applicable and click an update button. The customer can also log out of Account Access by clicking on a Logout button. Another button allows a customer 102 to view a Wallet History Page.

Figure 4G:
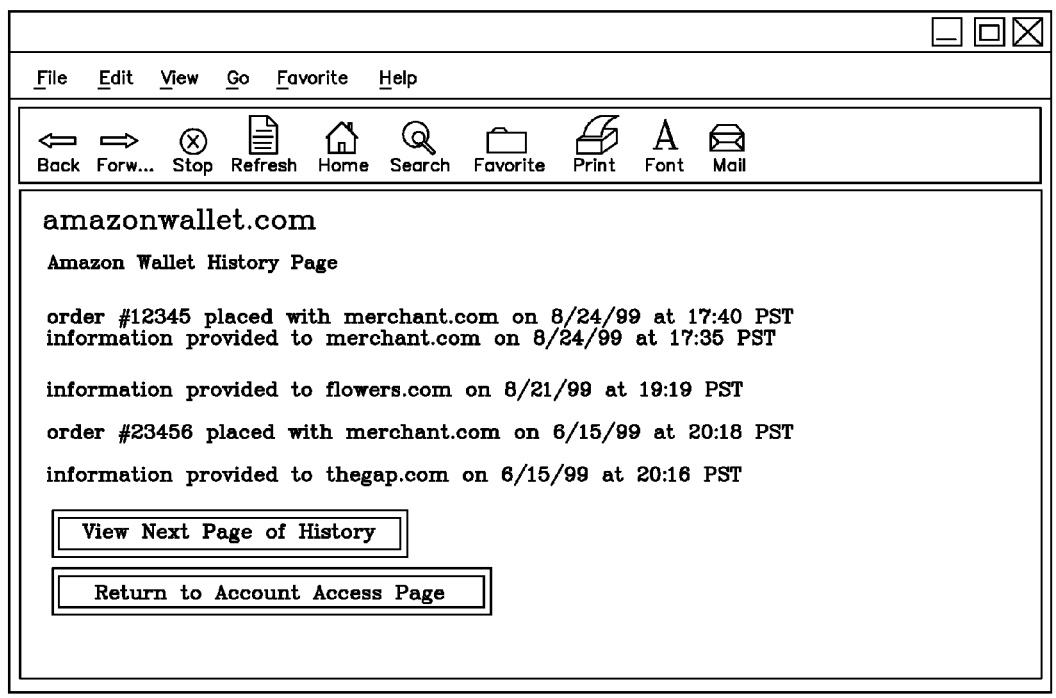

FIG. 4G illustrates the Wallet History Page reached from the Account Access Page of the Amazonwallet.com web site 116. The History Page shows a list of when and to whom the customer's information has been provided. In the illustrated example, the History Page also lists the orders placed using the Amazon Wallet in terms of the associated merchants with whom the orders were placed, the associated order numbers, and the times the orders were placed. These and other types of order history data may be may be reported by the merchants to the information service on an order-by-order, periodic, or other basis.

To assist the information service in creating an interests profile for each customer (which may in turn be disseminated to the merchants), the merchants could be requested or required to report keywords that describe the items purchased, and/or report "standard" product categories in which the purchased items fall. The standard set of item categories may be published by the information service to the various merchants. The use of keywords and or standard categories would allow the information service to build a customer profile without the need to maintain a database of the items offered by the various merchants.

B. Implementation

Figure 5:
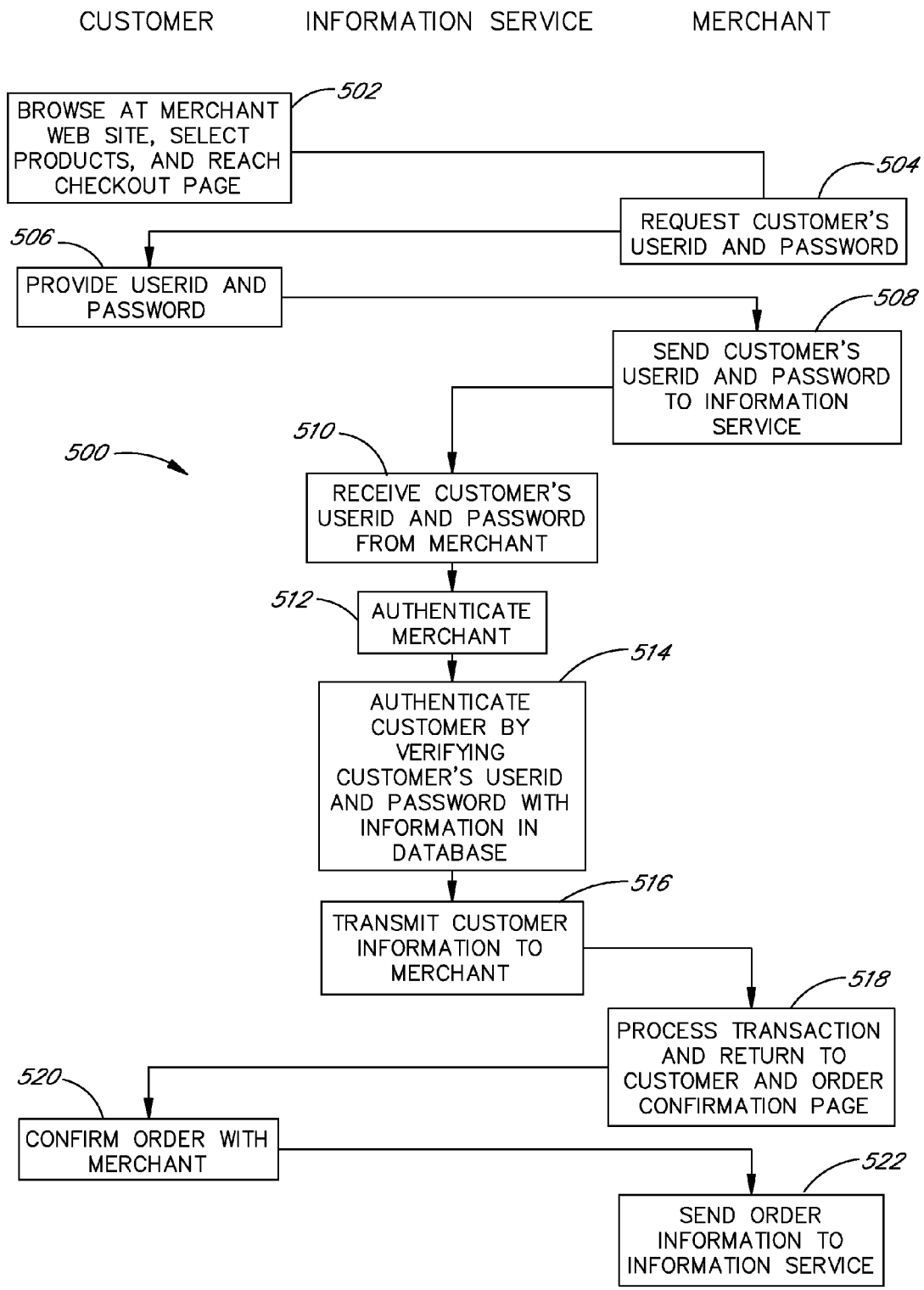
FIG. 5 is a flowchart illustrating a process through which the system provides customer information to a merchant in accordance with the first specific embodiment.
Figure 6:
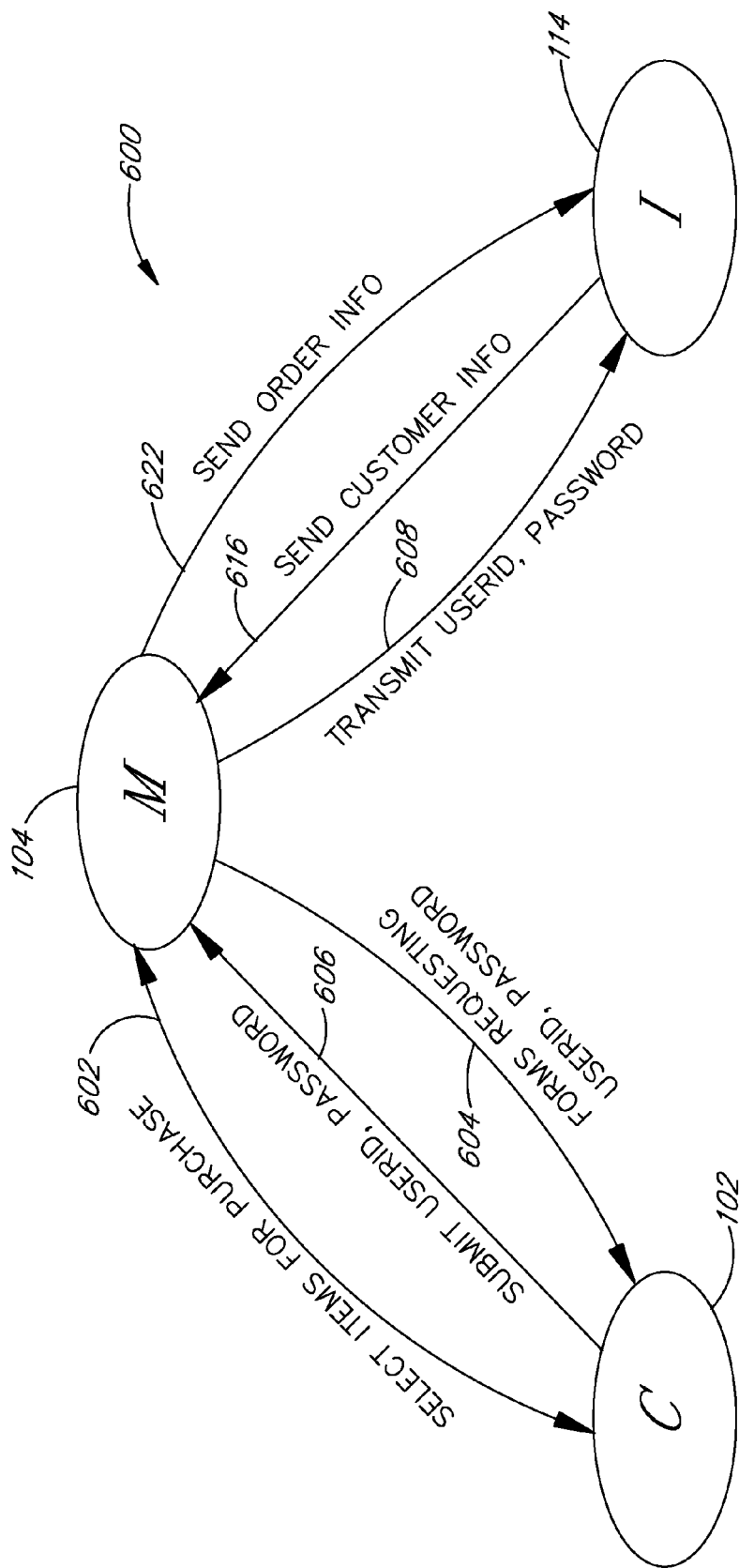
FIG. 6 illustrates a data flow diagram showing the transfer of information between the customer, the information service, and the merchant in accordance with the first specific embodiment.

FIG. 5 is a flowchart 500 illustrating a process through which customer information is provided to a merchant 104 in accordance with the first specific embodiment. The process illustrated in the flowchart 500 assumes that the customer has already signed up with the information service 114. FIG. 6 illustrates a data flow diagram 600 showing the transfer of information between the customer 102, the information service 114, and the merchant 104 in accordance with the first specific embodiment. The flowchart 500 will now be described in conjunction with the data flow diagram 600.

Referring to the flowchart 500 of FIG. 5, the customer 102 browses at the merchant web site 106 and identifies product(s) and/or service(s) for purchase at step 502, which is similar to step 222 of flowchart 220. The exchange of web pages and selections by the customer 102 and merchant 104 is indicated by the two-way link 602 in the data flow diagram 600, which is similar to the link 306 of the data flow diagram 300. Step 502 brings the customer 102 to a Checkout Page such as, for example, the one illustrated in FIG. 4B. At step 504, the merchant 104 requests that the customer 102 provide her user ID and password, such as, for example, is requested in the Checkout Page of FIG. 4B. The transmission of the request for the user ID and password is indicated by the one-way link 604 from the merchant 104 to the customer 102 in the data flow diagram 600. At step 506, the customer 102 provides her user ID, and password, such as, for example, by filling out the form in the Checkout Page of FIG. 4B and clicking to make the purchase. The submission of the user ID and password is indicated in the data flow diagram 600 by the one-way link 606 from the customer 102 to the merchant 104. The request and submission of the customer's user ID and password as in steps 504-6 can be accomplished using well-known techniques such as HTML forms and Common Gateway Interface (CGI), as well as SSL for security.

By sending her user ID and password to the merchant 104, the customer 102 has authorized the merchant 104 to retrieve her customer information from the information service 114. Accordingly, at step 508 the merchant 104 sends the user ID and password to the information service 114 as is depicted by the one-way link 608 from the merchant 104 to the information service 114 in the data flow diagram 600. The transmission of the user ID and password can be performed over an insecure communications network 112 such as the Internet by using a secure communications protocol. Alternatively, a secure direct link between the merchant 104 and the information service 114 could be established for communication between the information service 114 and the merchant 104.

At a next step 510, the information service 114 receives the information request 608, containing the customer's user ID and password, from the merchant 102. At step 512, in order to help prevent fraud, the information service 114 authenticates the merchant 104 by checking its database 120 to determine whether the merchant 104 requesting the information is registered with the information service 114. At step 514 the information service 114 authenticates the customer 104 by verifying that the submitted user ID and password match entries in the database 120. If the user ID and password match, then at step 516, the information service 114 returns to the merchant 104 the customer information associated with the user ID and password. The one-way link 616 in the data flow diagram 600 indicates the passing of the customer information to the merchant 104. In step 516, the customer information is preferably communicated over the same communications link as was used in step 508, but an alternate medium of communication could be used. It will be noted that steps 512 and 514 could be performed in an opposite order to that illustrated in the flowchart 500. Furthermore, step 512 is not essential to the operation of the present embodiment and serves only as an extra security measure.

At step 518 the merchant 104 receives the customer information and prepares the transaction for confirmation by the customer 102 by returning an order confirmation page to the customer 102. The order confirmation page could be, for example, the Order Confirmation Page illustrated in FIG. 4C. The order confirmation page preferably includes a button for the customer 102 to click, such as is illustrated in the Order Confirmation Page of FIG. 4C, to confirm her order. The order confirmation page may also be configured to allow a customer to modify the information for completing the transaction. Optionally, the customer information may include several credit card numbers, several delivery addresses, and other information selectable by the customer at the time of purchase. At the order confirmation page, the customer 102 could be prompted to select the appropriate information based upon which to complete the sale.

At a next step 520, the customer 102 confirms her order by clicking on the "confirm order" button. At this point, the merchant 104 can optionally display a Thank You page providing an order number, such as the one illustrated in FIG. 4D.

Once the order has been confirmed by the customer 102, the merchant 104 can use the credit card information included in the customer information to initiate a charge. The merchant 104 can also use the shipping information to ship the order to the customer 102, if necessary. At a next step 522, the merchant 104 can optionally send order information, such as an order number, back to the information service 114 to be displayed on an order history page, such as the one illustrated in FIG. 4G. The one-way link 622 in the data flow diagram 600 indicates the passing of the order information to the information service 114. As indicated above, the merchant may additionally or alternatively transfer other types of information about the order, such as keywords and categories of purchased items.

The merchant 104 may optionally create and account for the customer using the user ID and password entered by the user and the information obtained from the information service. In such implementations, the merchant and customer can subsequently transact business without the need for additional transfers of the customer's information. The merchant 104 may alternatively request the customer's information whenever the customer performs a transaction.

C. Alternative Implementations

In one alternative implementation of the present embodiment, the additional element of security information, such as a mother's maiden name, is not used to protect the customer's account access to the information service 114. In order to maintain the security of the system, Amazon Wallet holders can be informed to use their wallet only at well known Internet merchants 104 the legitimacy of which need not be questioned. For lesser-known Internet merchants, the information service 114 can post a listing of legitimate participants or registrants to the Amazon Wallet program. Amazon Wallet holders can consult this site if they are unsure of whether a particular merchant 104 is legitimate. Accordingly, the possibility that an illegitimate entity will be able to solicit user IDs and passwords is reduced.

The benefit of this alternative implementation is that many existing customer databases of Internet merchants may not include a second element of security information. By eliminating the use of the extra element of security information, these databases could be directly used to enable Amazon Wallet accounts for existing customers without additional user interaction or additional solicitations of information.

In another alternative implementation, request for the user ID and password in step 506 could be implemented with forms that, although located on the merchant web site 106, are submitted directly to the information service 114. In this embodiment, step 508 can be omitted and the merchant 104 does not see the customer's user ID or password.

IV. Second Specific Embodiment

In a second specific embodiment of the present invention, an Internet merchant 104 displays a link to the information service web site 116, preferably from an order page. After the link is followed, the information service web site 116 displays a form requesting the entry of a customer's user ID and password. Once the customer 102 submits her user ID and password to the information service 114, the information service 114 returns to the merchant 104 the customer information associated with the user ID and password. The customer is then directed back to an order confirmation page on the merchant web site 106 to confirm the sale. Once the customer 102 has confirmed the sale, the merchant 104 uses the customer information to process a payment and, if applicable, ship the order.

The primary distinction between the present embodiment and the previous embodiment is that the customer's user ID and password are submitted directly to the information service 114 rather than being passed through the merchant 104 to the information service 114. In accordance with the present embodiment, customers 102 are preferably informed only to submit their user IDs and passwords directly to the information service. Since customers 102 are informed only to submit their user ID and password to the information service web site 116, illegitimate entities would be deterred from setting up deceptive web sites to collect user IDs and passwords. In this manner, the present embodiment is able to increase security without requiring customers 102 to verify that individual merchants 104 are registered with the information service 114. The present embodiment also does not require an extra element of security information for account access in order to achieve this increased level of security. The present embodiment, therefore, could easily make use of existing customer databases that do not contain an extra element of security information. A further benefit is that user IDs and passwords need not be disclosed to the merchant 104. The user IDs and passwords may be valuable and confidential information that the information service 114 or customers 102 wish to maintain in secrecy.

In the first subsection below, a set of example web pages illustrates the present embodiment from the perspective of the customer 102. In a next subsection, a flowchart and data flow diagram illustrate the present embodiment from an implementation perspective.

A. Example Web Pages

FIGS. 7A-E illustrate a number of example web pages that are displayed to a customer 102 in accordance with the second specific embodiment of the present invention. Reference is also made back to some of FIGS. 4A-G since certain example pages are the same or similar. The illustrated example also uses the hypothetical Merchant.com, Amazonwallet.com, and Amazon Wallet terms introduced in the first specific embodiment above.

FIG. 7A illustrates an Amazon Wallet New User Page of the Amazonwallet.com web site 116. The page is similar to the page of FIG. 4A, however, the field requesting the mother's maiden name and the accompanying security note are omitted. In place of the security note is preferably a security note warning customers that they should only submit their user ID and password to the Amazonwallet.com web site. Once a new customer 102 fills in the new user information and submits the form, the customer 102 can then use the wallet to shop at the web sites of Internet merchants that have registered with the information service 114.

If the customer 102 is already an existing customer of Amazon.com, which preferably operates Amazonwallet.com, the process of filling in the new user information may be bypassed. In this case, the customer information already on file with Amazon.com could be used to make the Amazon Wallet automatically active.

Figure 7B:
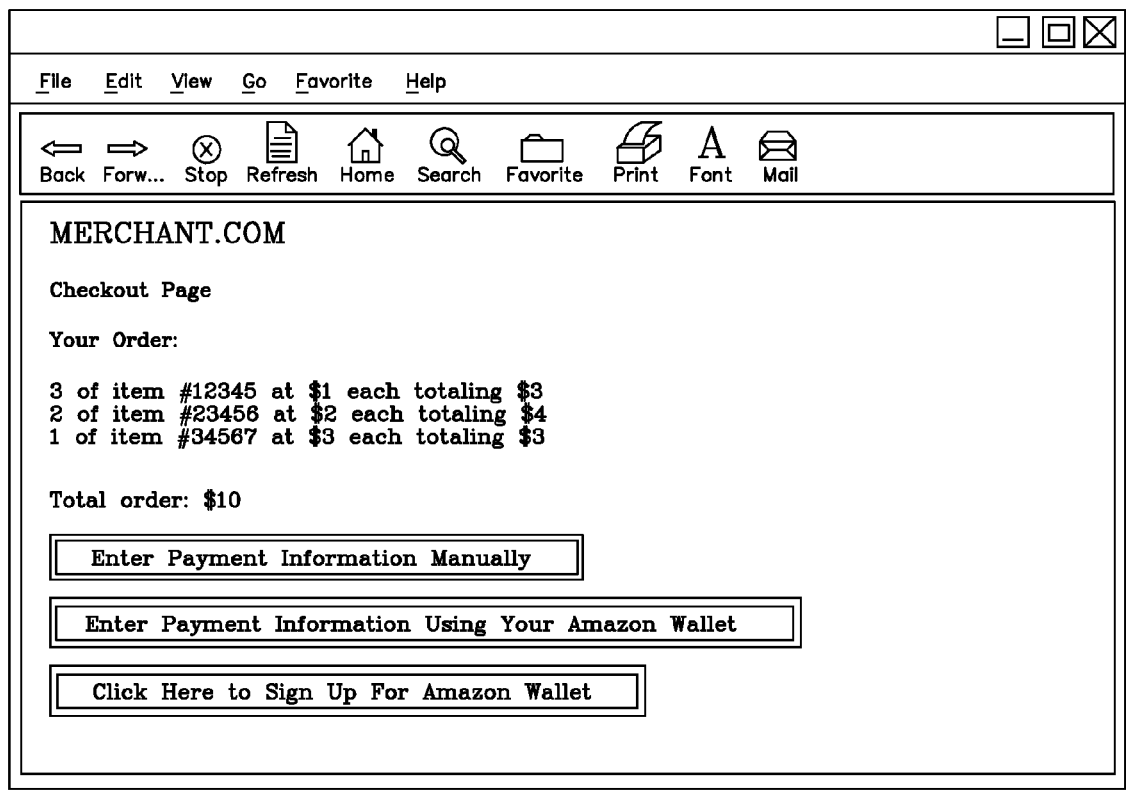

FIG. 7B illustrates a Checkout Page that a customer 102 reaches at the Merchant.com web site 106 after selecting one or more products and/or services for purchase. The Checkout Page lists the order and presents to the customer 102 a button to use the Amazon Wallet for entry of payment and/or shipping information. If the customer 102 chooses to use the Amazon Wallet, the customer 102 clicks on the associated button and is directed to the Amazon Wallet Authentication Page.

FIG. 4C illustrates the Amazon Wallet Authentication Page of the Amazonwallet.com web site 116. The page requests the user ID and password of the customer 102. The page provides a button for account access. The page also provides a button that can be clicked to send the customer information to the referring merchant 102. Assuming that the latter button is clicked, the customer information is transferred to the referring merchant and the customer's web browser 109 is then directed back to the merchant's web site.

Figure 7C:
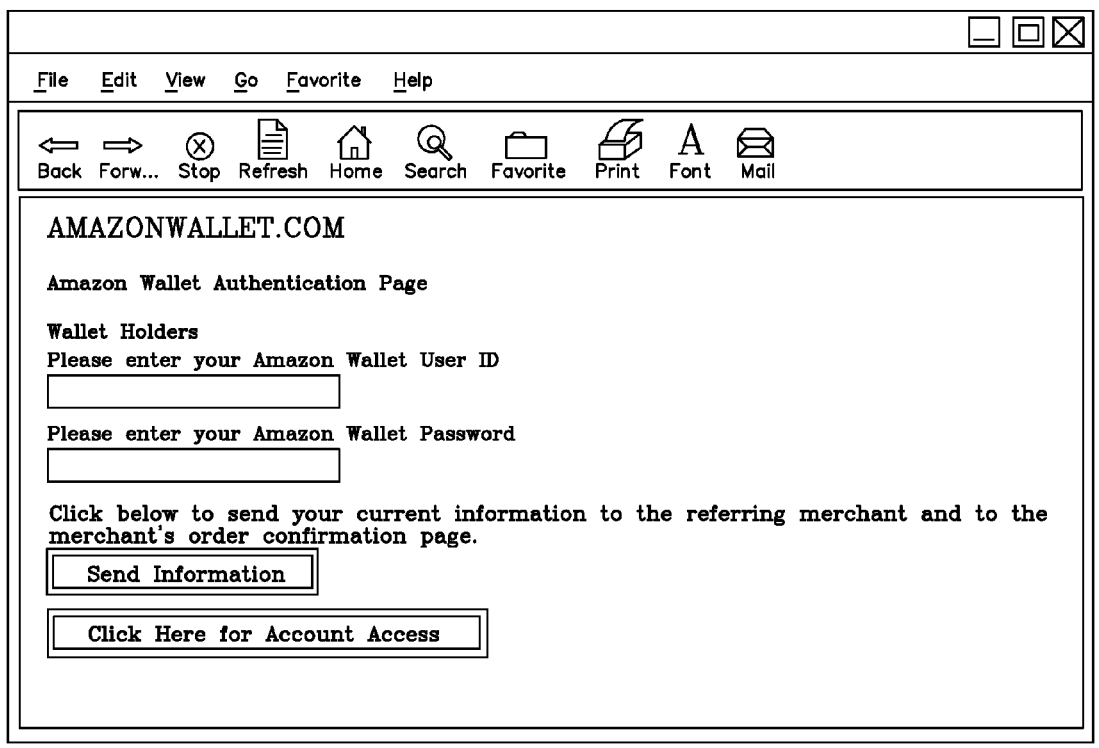
Figure 7D:
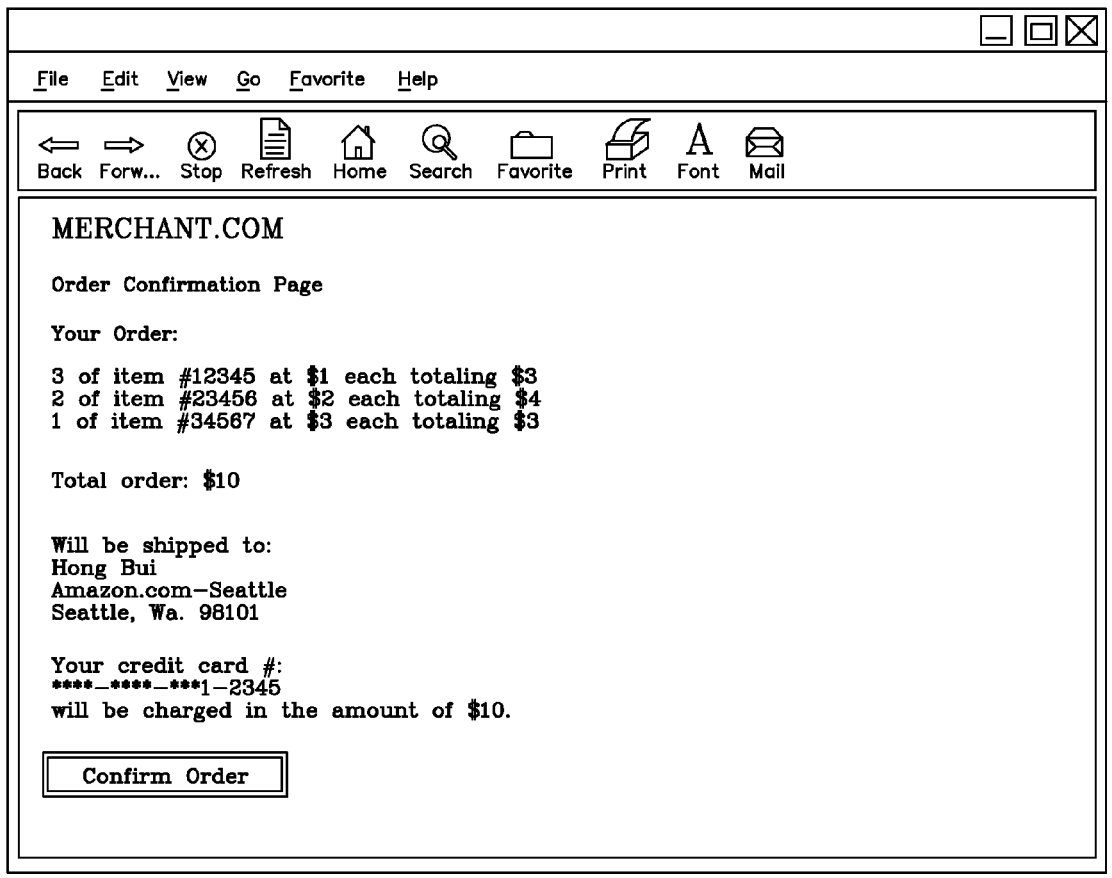

FIG. 7D illustrates an Order Confirmation Page of the Merchant.com web site 106 that is displayed to the Amazon Wallet customer 102 after returning from the Amazon Wallet Authentication Page. The page again lists the order, the name of the customer 102 in order to confirm the identity of the customer, the shipping address, and the last several digits of the credit card being charged. The additional information such as the customer's shipping address can be safely displayed here since AmazonWallet.com has authenticated the customer and there is a low risk that the user ID and password have been compromised. The page also displays a "confirm order" button. After selecting the "confirm order" button, the Amazon Wallet customer next sees a Thank You page of the type illustrated in FIG. 4D. The page confirms that the order has been placed, provides an order number for order tracking, and thanks the customer 102.

Figure 7E:
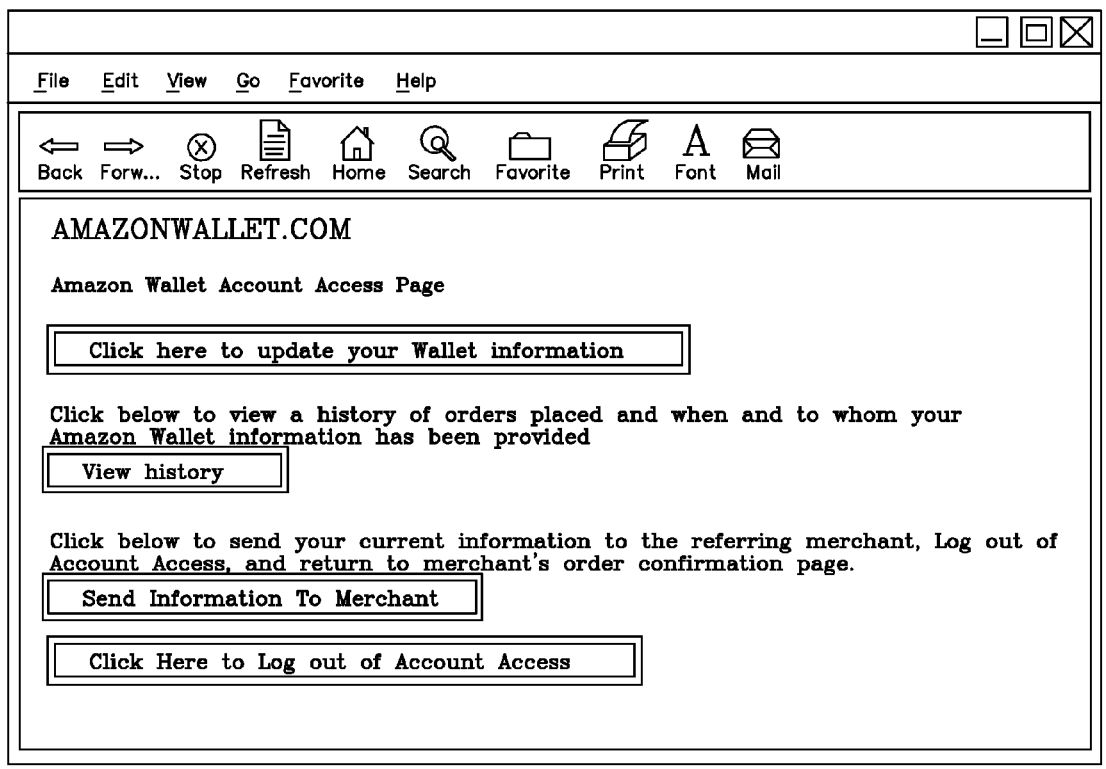

FIG. 7E illustrates an Amazon Wallet Account Access Page of the Amazonwallet.com web site 116 that is reached by customers 102 by selecting the account access button from the Amazon Wallet Authentication Page of FIG. 7C. This page of the Amazonwallet.com web site allows Wallet customers 102 to view and update their Wallet account information in a manner similar to the first specific embodiment. An optional link can be displayed if the customer entered the Account Access Page after being referred by a merchant to the AmazonWallet.com web site. The optional link allows the customer 102 to submit her customer information to the referring merchant and log out of Account Access simultaneously. The customer can also log out of Account Access by clicking on a Logout button. Another button allows a customer 102 to view a History Page that is similar to that illustrated in FIG. 4G. As in the first specific embodiment, the history page can also display a listing of the purchases made using the Amazon Wallet.

B. Implementation

Figure 8:
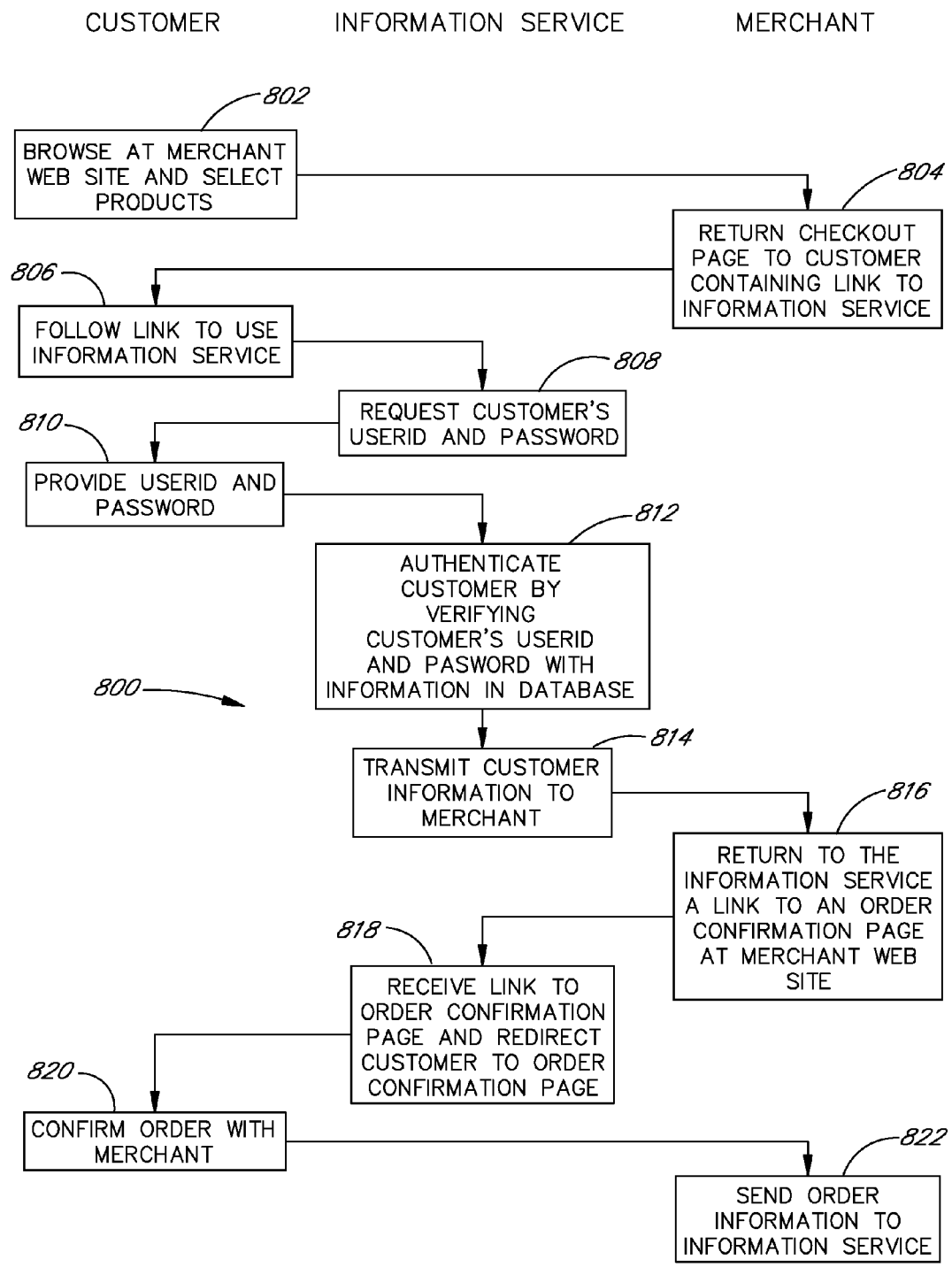
FIG. 8 is a flowchart illustrating a process through which the system provides customer information to a merchant in accordance with the second specific embodiment.
Figure 9:
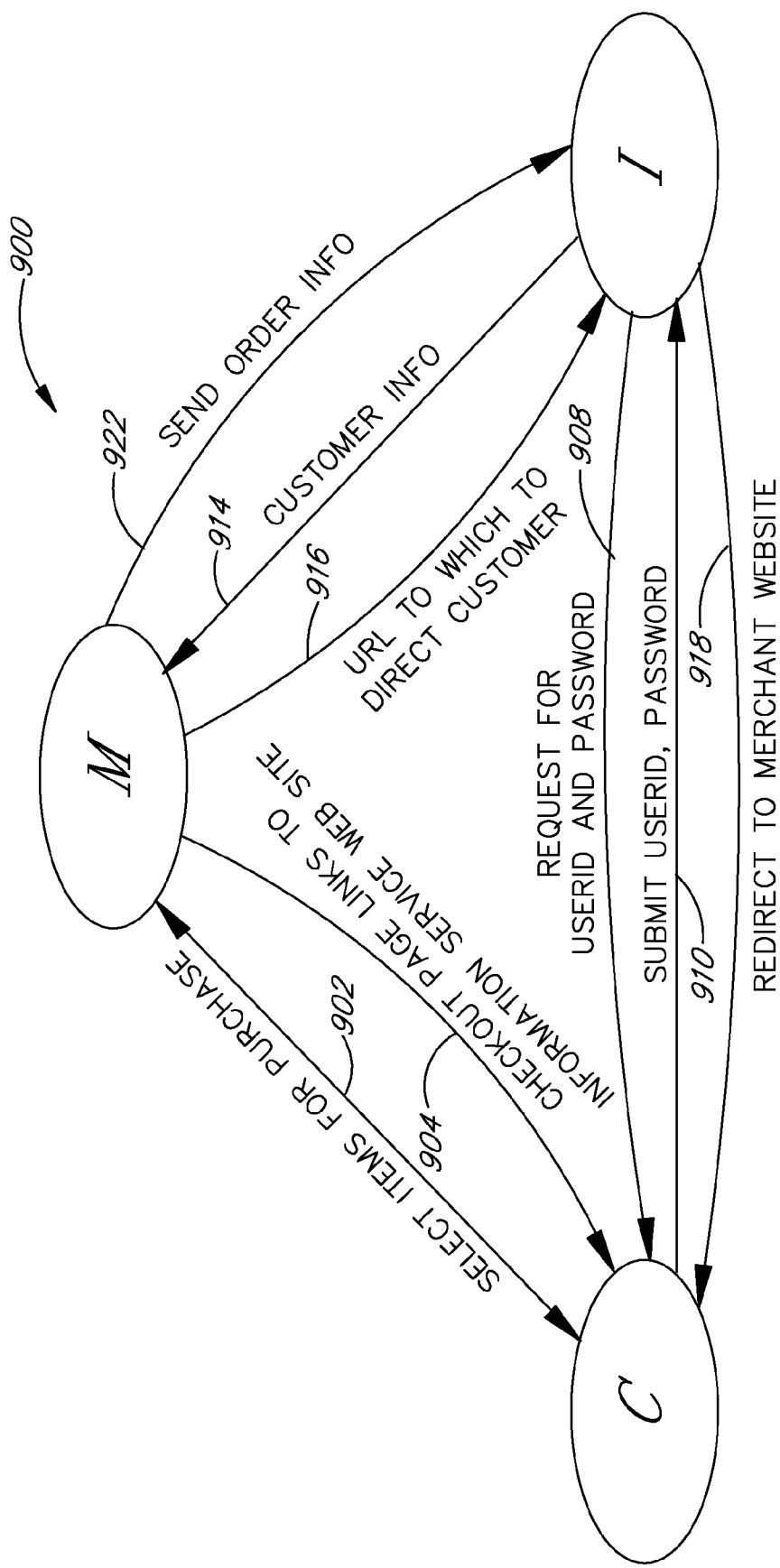
FIG. 9 illustrates a data flow diagram showing the transfer of information between the customer, the information service, and the merchant 104 in accordance with the second specific embodiment.

FIG. 8 is a flowchart 800 illustrating a process through which customer information is provided to a merchant 104 in accordance with the second specific embodiment. The process illustrated in the flowchart 800 assumes that the customer has already signed up with the information service 114. FIG. 9 illustrates a data flow diagram 900 showing the transfer of information between the customer 102, the information service 114, and the merchant 104 in accordance with the second specific embodiment. The flowchart 800 will now be described in conjunction with the data flow diagram 900.

Referring to the flowchart 800 of FIG. 8, the customer 102 browses at the merchant web site 106 and identifies product(s) and/or service(s) for purchase at step 802, which is similar to step 502 of flowchart 500. The exchange of web pages and selections by the customer 102 and merchant 104 is indicated by the two-way link 902 in the data flow diagram 900, which is similar to the link 602 of the data flow diagram 600. At step 804, the merchant 104 returns to the customer 102 a Checkout Page such as, for example, the one illustrated in FIG. 7B. The Checkout Page displays a link to the information service web site 116 allowing the customer 102 to use the information service 114 to provide payment information. The transfer of the Checkout Page containing the link to the information service web site 116 is indicated by the one-way link 904 in the data flow diagram 900. At step 806, the customer 102, choosing to use the information service 114, follows the link to the information service web site 116.

In one implementation of the present embodiment, the link to the information service web site 116 provided in step 804 can be configured, using the well-known techniques of URL encoding and CGI (Common Gateway Interface), to transfer information to the information service server 118. Using URL encoding, the merchant appends a code identifying itself and an identifying order number to the link to the information service web site 116. Additionally, the merchant could encode other information, such as, for example, item numbers, prices, etc. in the link to the information service web site 116. When the link is followed the appended information is submitted to a CGI program or script on the information service server 118. The CGI program on the information service server 118 can then identify the merchant and an identifying order number.

At step 808, the CGI program returns to the customer 102 a request for the customer's user ID and password. The request is preferably implemented using a form such as, for example, the one illustrated in FIG. 7C. The transmission of the request for the user ID and password is indicated by the one-way link 908 from the information service 114 to the customer 102 in the data flow diagram 900. At step 810, the customer 102 provides her user ID and password and submits the form to another CGI program located on the information service server 118. The submission of the user ID and password is indicated in the data flow diagram 900 by the one-way link 910 from the customer 102 to the information service 114. The request and submission of the customer's user ID and password as in steps 808-810 can be accomplished using well-known techniques such as HTML forms and Common Gateway Interface (CGI), as well as SSL for security.

At step 812, the CGI program authenticates the customer by checking that the submitted user ID and password combination is present in the information service database 120. At step 814, if the authenticity of the customer 102 is verified, the CGI program sends the customer information associated with the user ID to the merchant 104. The information server 118 preferably appends to the customer information the identifying order number that was originally provided by the merchant 104. The identifying order number allows the merchant 104 to associate the customer information received with a pending order. The transmission of the customer information from the information service 114 to the merchant 104 is indicated by the one-way link 914 in the data flow diagram 900. The customer information can be sent in any number of ways, such as, for example, using URL encoding, CGI, and SSL over the Internet. Alternatively, the information could be transferred over a direct link between the information service 114 and the merchant 104. There are also numerous other well-known protocols and methods that could be used to securely transfer the information.

At a next step 816, the merchant 104 receives the customer information and the associated order number. The merchant 104 then processes the customer information and returns, to the information service 114, a link or uniform resource locator (URL) to a new order confirmation page. The transfer of the URL from the merchant 104 to the information service 114 is indicated by the one-way link 916 in the data flow diagram 900. At a next step 818 the information service 114 receives the link to the order confirmation page and redirects the customer 102 to the page. The passing of the URL of the page to which the customer 102 is redirected is indicated by the one-way link 918 from the information service 114 to the customer 102 in the data flow diagram 900.

From the perspective of the customer 102, all of steps 812-816 appear as one step in which the customer submits her user ID and password and is then brought to the order confirmation page, such as, for example, the page illustrated in FIG. 7D. The order confirmation page preferably includes a button for the customer 102 to click to confirm her order. The order confirmation page may also be configured to allow a customer to modify the information based upon which the sale will be completed. Optionally, the customer information may include several credit card numbers, delivery addresses, etc. that are selectable by the customer at the time of purchase.

At step 820, the customer 102 confirms the order by clicking on the "confirm order" button. At this point, the merchant 104 can optionally display a Thank You page providing an order number, such as the one illustrated in FIG. 4D of the first specific embodiment.

Once the order has been confirmed by the customer 102, the merchant 104 can use the credit card information included in the customer information to initiate a charge against the customer's credit card. The merchant 104 can also use the shipping information to ship the order to the customer 102, if necessary. At step 822, the merchant 104 can optionally send order information, such as an order number, back to the information service 114 to be displayed on an order history page, such as the one illustrated in FIG. 4G of the first specific embodiment. The one-way link 922 in the data flow diagram 900 indicates the passing of the order information to the information service 114. As indicated above, the order information, which may include item keywords and categories, may be aggregated by the information service and used to generate and disseminate customer profiles.

V. Third Specific Embodiment

In a third specific embodiment of the present invention, an Internet merchant 104 displays a button on an item detail or other page that allows a customer 102 to purchase an item with a single mouse click without ever having provided information to or registered with the merchant 104. In response to the single mouse click, the information service 114 provides the customer information and an identification of the desired product to the merchant 104. The customer 102 enables this single click feature, after registering with the information service 114, by submitting her user ID and password to the information service 114 for authentication.

The use of a single mouse click or other action to make a purchase from a merchant is described in U.S. Pat. No. 5,960,411. The present embodiment extends the use of the single-click concept to function with merchants with whom the customer has no previous established relationship. Like the presently implemented 1-Click system, the present embodiment is preferably configured to consolidate all purchases from a single merchant 104 using a single-click service within a time period, such as 90 minutes, into a single order. Alternatively, other single-click order consolidation schemes could be used.

In the first subsection below, a set of example web pages illustrates the present embodiment from the perspective of the customer 102. In a next subsection, a flowchart and data flow diagram illustrate the present embodiment from an implementation perspective. In a third subsection, a number of alternative implementations of this embodiment are disclosed.

A. Example Web Pages

FIGS. 10A-E illustrate a number of example web pages that are displayed to a customer 102 in accordance with the third specific embodiment of the present invention. Reference is also made back to some of FIGS. 7A-E since certain example pages are the same or similar. In the illustrated example, Merchant.com, a hypothetical merchant, serves as the Internet merchant 104, and Amazon 1-click.com serves as the hypothetical information service 114. In the context of these web pages, "1-Click" represents the name of the service provided by the present embodiment that a customer 102 uses to make purchases using only a single mouse click from Internet merchants with which the customer may have no previous existing relationship.

Referring back to FIG. 7A, a New User Page similar to that illustrated for the second specific embodiment could also be used to register customers for the third specific embodiment. The 1-Click New User Page is located on the Amazon 1-click.com web site 116. The security note warning customers that they should only submit their user ID and password to, in this case, the Amazon 1-click.com web site, is preferably retained. Once a new customer 102 fills in the new user information and submits the form, the customer 102 can then activate the 1-Click feature to shop at the web sites of Internet merchants that have registered with the information service 114.

If the customer 102 is already an existing customer of Amazon.com, which operates Amazon 1-click.com in this example, the process of filling in the new user information may be bypassed. In this case, the customer information already on file with Amazon.com could be used to make the Amazon Wallet automatically active.

Figure 10A:
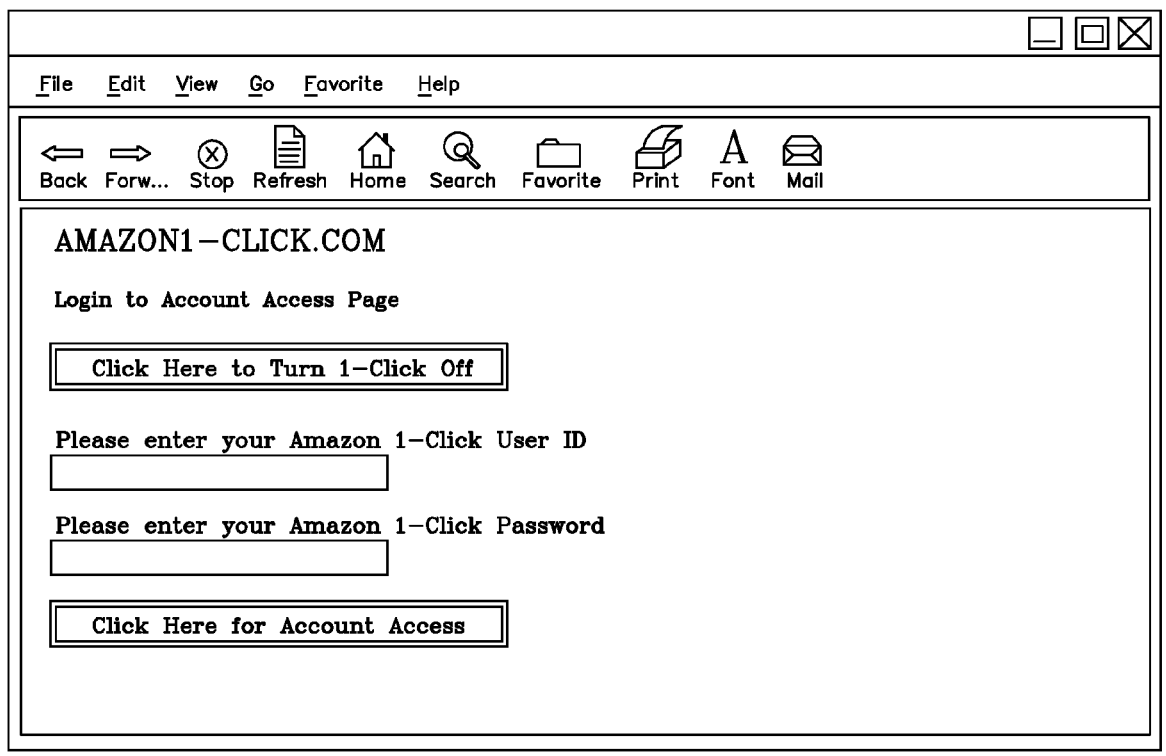
FIGS. 10A-E illustrate a number of example web pages that are displayed to a customer in accordance with a third specific embodiment of the present invention.

FIG. 10A illustrates a Login to Account Access Page located on the Amazon 1-click.com web site 116. This page serves as a gateway to the customer's access to her own customer information and 1-Click settings. An additional button can be displayed on this page allowing a customer to turn the 1-Click service off if it is presently turned on.

Figure 10B:
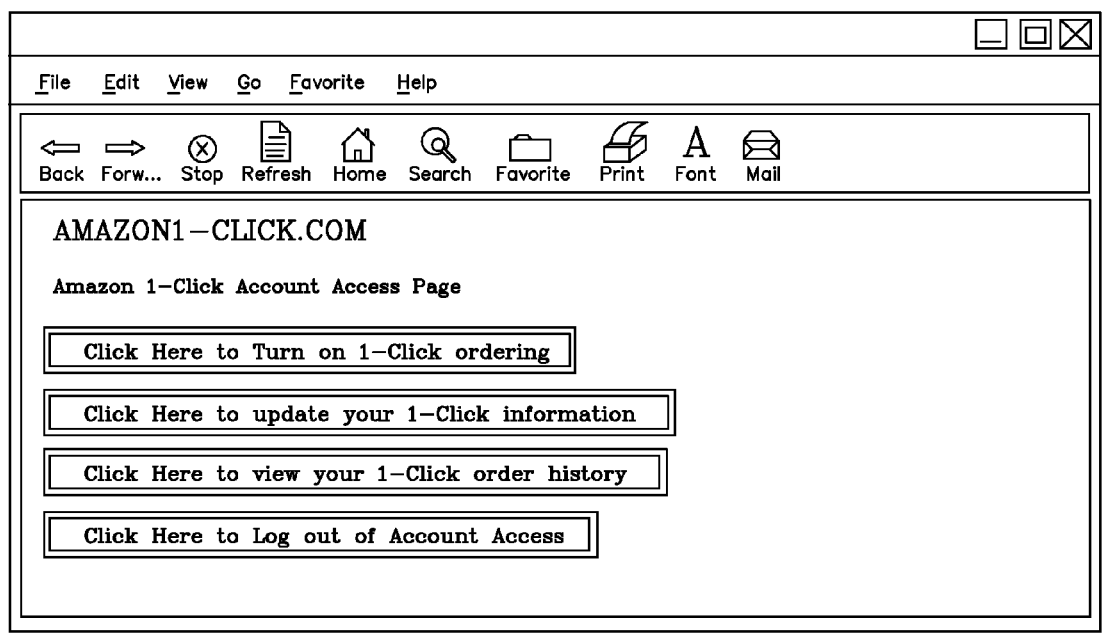

FIG. 10B illustrates a 1-Click Account Access Page, located on the Amazon 1-click.com web site 116, that is reached from the Login page of FIG. 10A. One button on the page allows a customer 102 to activate the 1-Click feature. The page also allows 1-Click customers 102 to view and update the 1-Click account information by clicking on an Update button. The Update button leads to an Update Page (not illustrated) that is similar in layout to the New User Page, but preferably has the information fields already filled in. An Order History button allows a customer 102 to view an Order History Page that will be discussed below. The customer can also log out of Account Access by clicking on a Logout button.

Figure 10C:
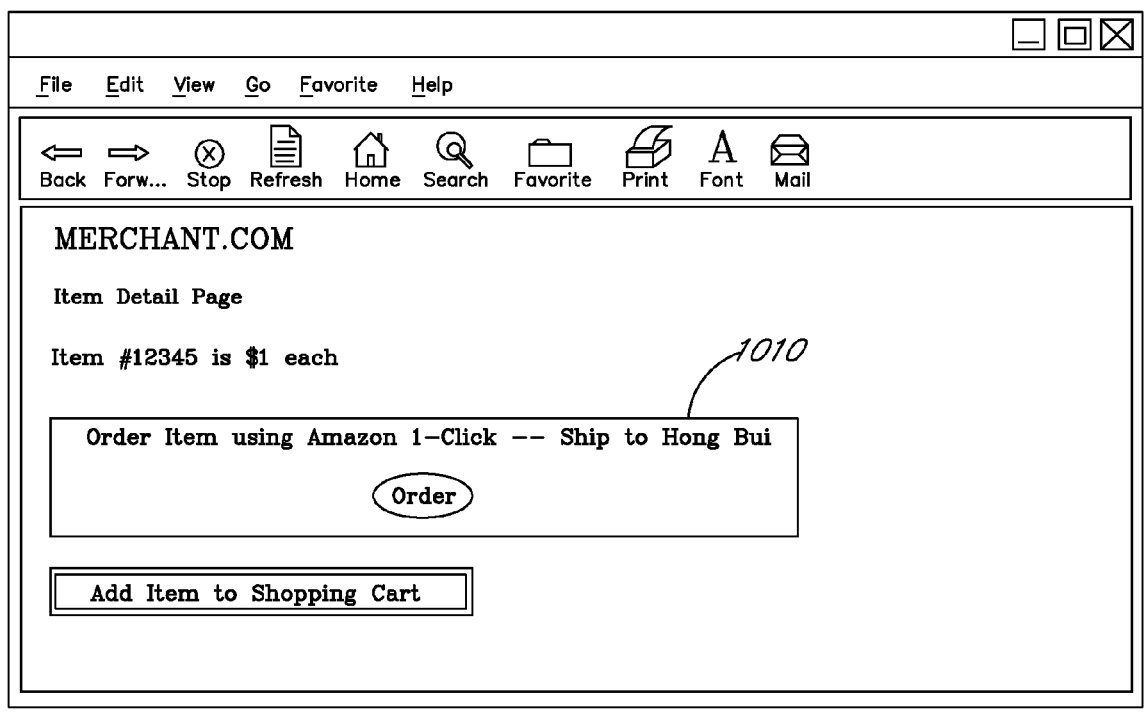

FIG. 10C illustrates an Item Detail Page that is displayed on the Merchant.com web site 106 if the customer 102 has activated the 1-Click feature. A 1-Click purchase graphic 1010, allowing the customer 102 to purchase the displayed product using the 1-Click feature, is displayed with the name of the customer 102. By clicking on the 1-Click graphic 1010, an order is automatically generated and the customer's information is automatically retrieved from the information service 114 with no further action on the part of the customer 102. Preferably, after a waiting time, such as 90 minutes, the customer 102 is charged and (if applicable) shipment is initiated. The waiting time gives the customer an additional opportunity to make additional purchases using the 1-Click feature and have the additional purchases consolidated into a single order and possibly shipped together. Another button titled "Add Item to shopping cart" gives the customer 102 the option of adding the displayed item to a shopping cart in order to make a purchase using conventional methods.

Figure 10D:
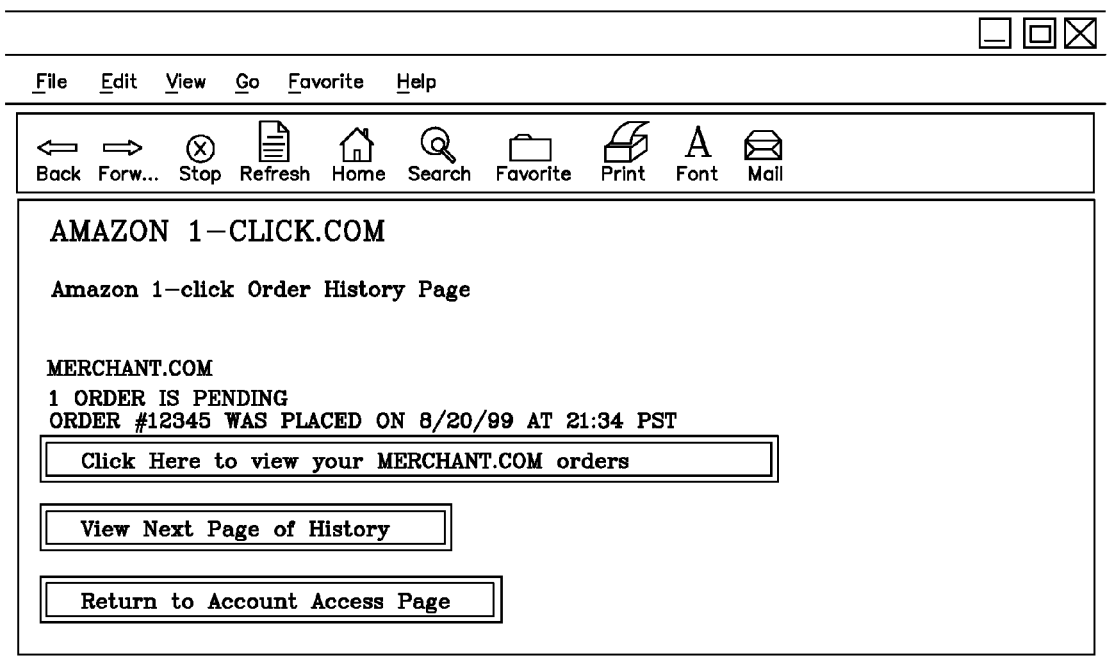

FIG. 10D illustrates a 1-Click Order History Page that can be accessed by a customer on the Amazon 1-click.com web site 116 from the Account Access Page. The Order History page displays a listing, for each merchant 104, of the pending and placed orders using the 1-Click service. Pending orders are those for which the waiting time has not expired. Associated with each merchant 104 is a link or button that takes the customer 102 to an Order History and Review Page for the respective merchant 104.

Figure 10E:
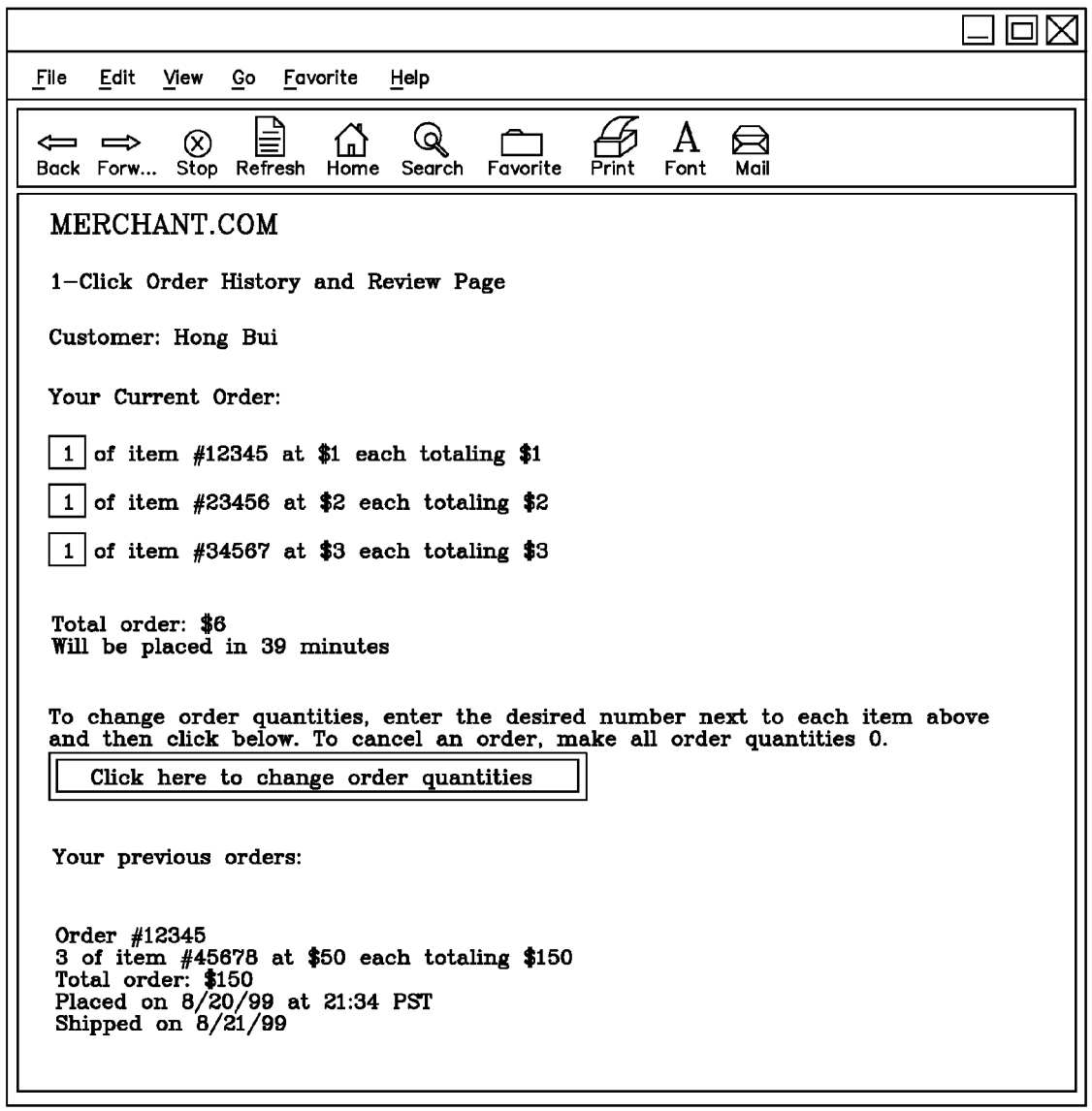

FIG. 10E illustrates the Order History and Review Page located on the Merchant.com web site 106. The page displays a history of placed orders and some information relating to the orders. The page also displays any pending orders and gives the customer 102 the option of changing the quantities of the products in the pending order. The time remaining before the pending order will be placed may also be displayed.

B. Implementation

Figure 11B:
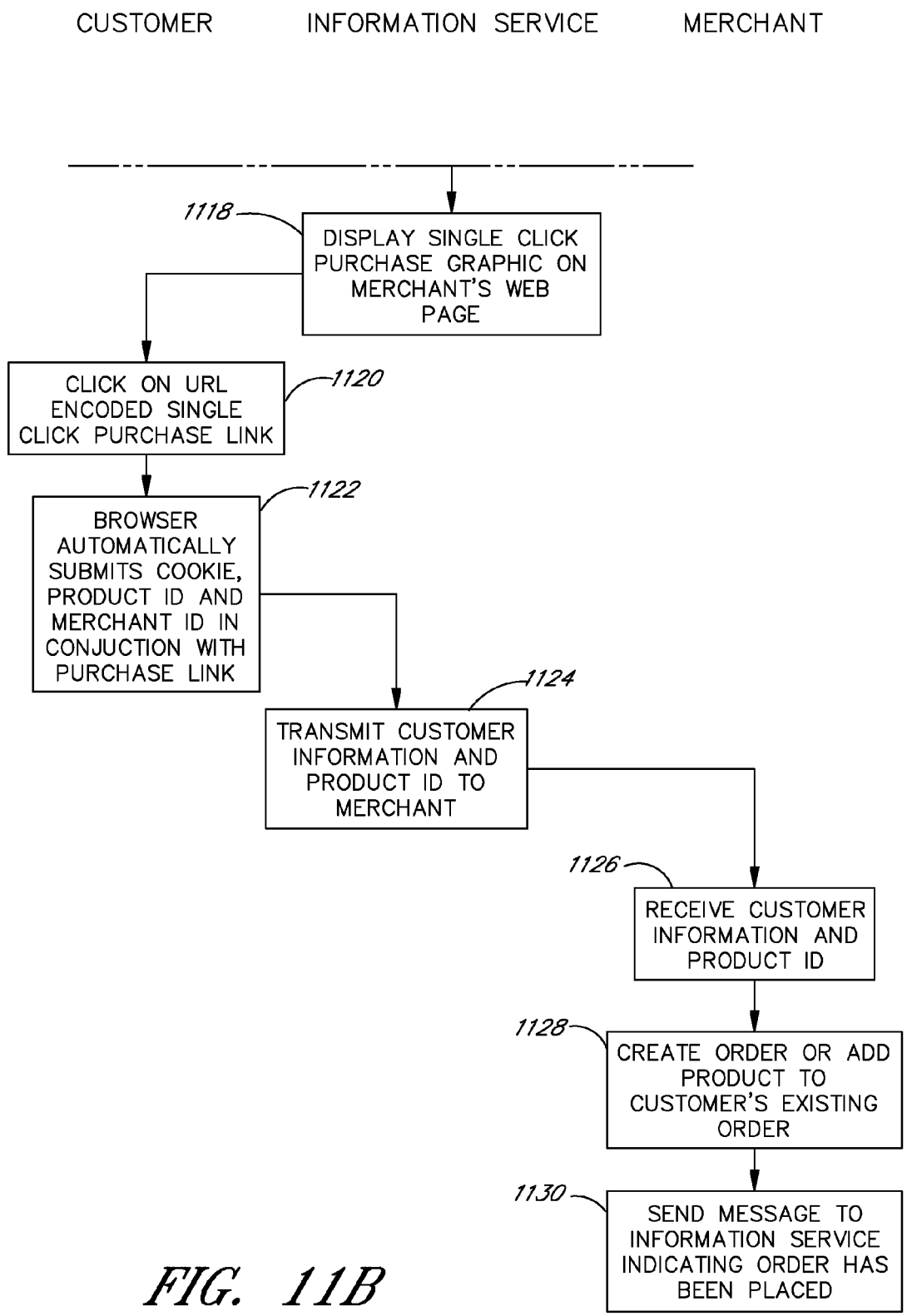
Figure 12:
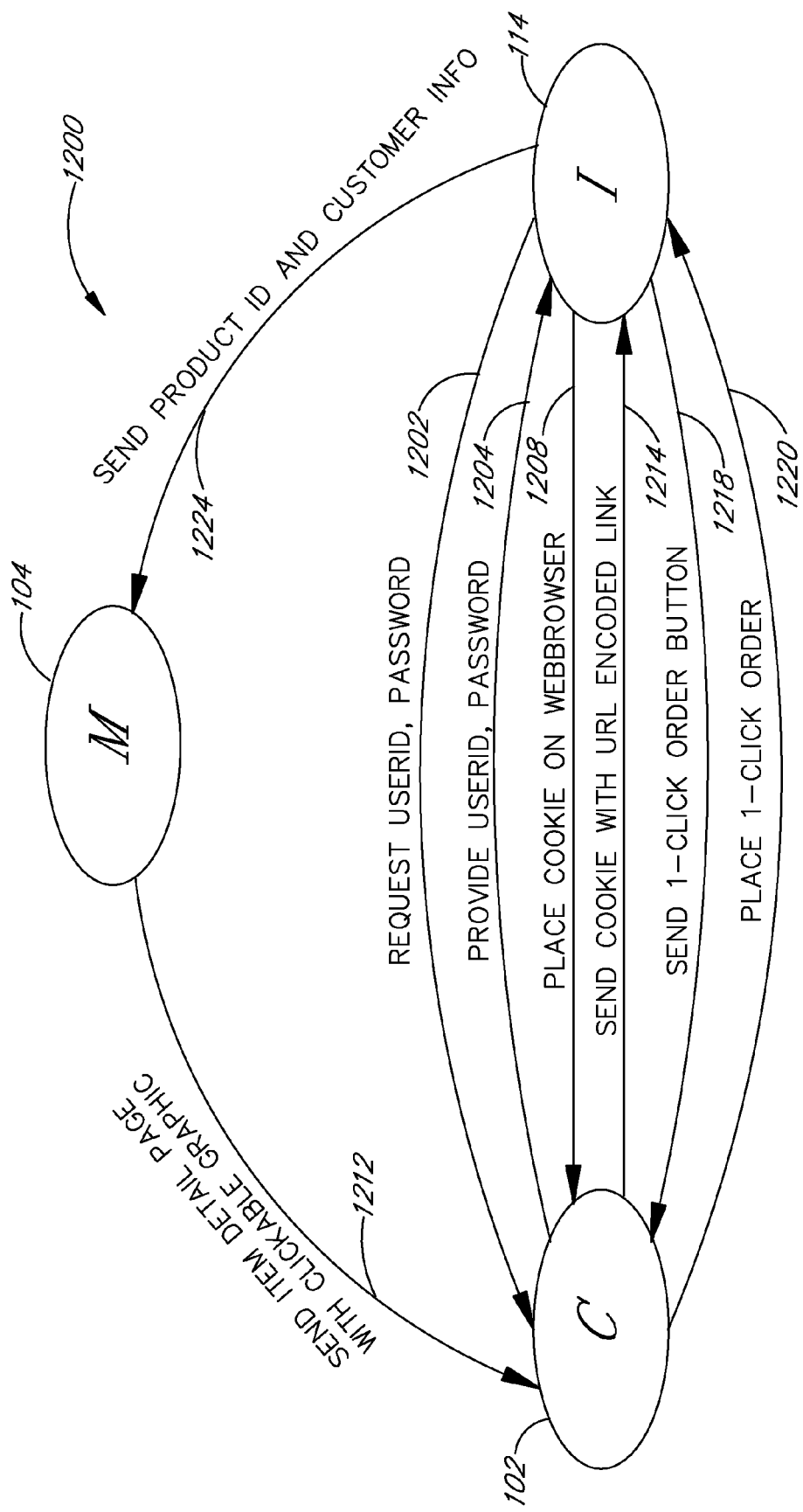
FIG. 12 illustrates a data flow diagram showing the transfer of information between the customer, the information service, and the merchant in accordance with the third specific embodiment.

FIGS. 11A-B are a flowchart 1100 illustrating a process through which customer information is provided to a merchant 104 in accordance with the third specific embodiment. The process illustrated in the flowchart 1100 assumes that the customer has already signed up with the information service 114. FIG. 12 illustrates a data flow diagram 1200 showing the transfer of information between the customer 102, the information service 114, and the merchant 104 in accordance with the third specific embodiment. The flowchart 1100 will now be described in conjunction with the data flow diagram 1200.

Referring now to the flowchart 1100, at step 1102, the information service server 118, in response to the customer 102 accessing the information service web site 116, requests the customer's user ID and password. The request is preferably implemented using a form such as, for example, the one illustrated in FIG. 10A. The transmission of the request for the user ID and password is indicated by the one-way link 1202 from the information service 114 to the customer 102 in the data flow diagram 1200. At step 1104, the customer 102 provides her user ID and password and submits the form to a CGI program located on the information service server 118. The submission of the user ID and password is indicated in the data flow diagram 1200 by the one-way link 1204 from the customer 102 to the information service 114. The request and submission of the customer's user ID and password as in steps 1102-1104 can be accomplished using well-known techniques such as HTML forms and Common Gateway Interface (CGI), as well as SSL for security.

At step 1106, the CGI program authenticates the customer by checking that the submitted user ID and password combination is present in the information service database 120. If the authenticity of the customer 102 is verified, the CGI program directs the customer's web browser 109 to an account access page such as the one illustrated in FIG. 10B. The account access page allows the customer 102 to activate the single click feature by clicking on a button. At step 1108, if the customer 102 chooses to activate the single click feature, the information service server 118 returns to the customer 102 a new web page (not illustrated by example in the figures) informing the customer 102 that the single click feature has been activated. In returning the new web page, server 118 places a cookie on the customer's computer 110. The cookie contains information identifying the customer 102 and indicating that the customer 102 has activated the single click feature. The transfer of the cookie is indicated in the data flow diagram 1200 by the one-way link 1208 from the information service 114 to the customer 102.

The use and characteristics of cookies in conjunction with web browsers are well known in the art and will not be discussed in detail herein. One important characteristic of cookies, however, should be kept in mind. Each cookie has a parameter, called its domain, that specifies the valid domain of the cookie. Whenever a link is followed to a web server with a domain name within the cookie's domain, the information in the cookie is also passed along to the server. Furthermore, in placing a cookie on a customer's computer 110, a server may only assign to it a domain to which the server belongs. Accordingly, in the present embodiment, the cookie placed on the customer's computer 110 by the information service server 118 is only returned to servers with the same domain name as the information service server 118. As a consequence, the cookie identifying the customer 102 and signifying that the customer has enabled the single click feature will not be passed on to merchant servers 108 having different domain names than the information service server 118. Although the cookie will not be submitted to the merchant server 108, the merchant server can display a web page with a link to the information service server 118. This link, in turn, will cause the cookie to be submitted to the information service server.

Once the customer 102 has activated the single click feature, the customer 102 browses a merchant web site 106 at step 1110. At step 1112, the merchant 104 displays an item detail page on the customer's web browser 109, such as for example, the page in FIG. 10C. The item detail page identifies the item and provides a single click purchase graphic 1010 (FIG. 10C) for which the image is retrieved from the information service server 118. The transfer of the item detail page is indicated by the one-way link 1212 from the merchant 104 to the customer 102 in the data flow diagram 1200.

At step 1114, when the customer's web browser 109 encounters the URL of the graphic 1010, the browser 109 automatically generates an HTTP request to retrieve the graphic 1010 from the information service server 118. Since the domain name of the information service server 118 is within the domain of the cookie placed on the customer's computer 110, the cookie is also sent in conjunction with the request. The transmission of the cookie with the request for the graphic 1010 is indicated by the one way link 1214 from the customer 102 to the information service 114 in the data flow diagram 1200.

At step 1116, a CGI program on the information service server 118 receives the HTTP request for the graphic 1010 from the customer's web browser 109. If the customer 102 has activated the single click feature, the CGI program retrieves the customer information associated with the cookie that was sent along with the request. At a next step 1118, the CGI program responds to the web browser's request for the graphic 1010 with an image that is displayed by the customer's web browser 109. As depicted in FIG. 10C, the image is preferably in form of a box that identifies the customer and gives the customer 102 the option of clicking on a button to purchase the featured item. The transfer of the image is represented by the one-way link 1218 from the information service 114 to the customer 102 in the data flow diagram 1200.

Returning to step 1116, if the customer 102 has not activated the single click feature, no cookie is sent to the CGI program processing the request on the information service server 118. In this case the CGI program can respond to the HTTP request for the graphic with an image offering the customer 102 the opportunity to activate or sign up with the single click service. Alternatively, during a previous step, the information service 114 could have placed a cookie on the customer's computer 110 indicating that the customer 102 has signed up for the service but has not activated it. In this case the CGI program can display the appropriate image offering the customer 102 the opportunity to either sign up for or activate the single click feature as applicable.

At a next step 1120, a customer 102 who has activated the single click feature clicks on the single click purchase graphic 1010 downloaded from the information service server 118. The associated with the graphic 1010 is a link that is also serviced by the information service server 118 through another CGI program. Therefore, at step 1122, the customer's web browser 109 again submits the cookie to the information service server 118. The link associated with the graphic 1010 also has appended to it, preferably using URL encoding, a merchant identifier by which the information service 114 can identify the merchant 104, as well as a product identifier by which the merchant 104 can identify the selected product. In sum, by clicking on the graphic 1010 and following the link to the information service server 118, the customer 102 provides the cookie identifying the customer 102 as well as the identity of the desired product and the identity of the associated merchant, which are encoded within the URL of the link associated with the graph 1010. The customer's clicking on the graphic 1010 generates another HTTP request that is indicated by the one-way link 1120 from the customer 102 to the information service 114 in the data flow diagram 1200.

At step 1124 the CGI program on the information service server 118 processes the HTTP request resulting from the click on the single click purchase graphic 1010. The CGI program compiles the customer information associated with the cookie from the database 120, appends the product ID that was URL encoded with the URL associated with the graphic 1010, and sends the information to the merchant 104. The communication of the information from the information service 114 to the merchant 104 is indicated by the one-way link 1224 in the data flow diagram 1200. This communication can be effectuated through any of the methods suggested in conjunction with the first and second specific embodiments above. In response to the HTTP request resulting from the customer's selection of the graphic 1010, the information service server 118 can return to the customer 102 a thank you page (not illustrated) confirming that the single click purchase has been processed.

At a next step 1126, the merchant 104 receives the customer information and product ID. At step 1128, the merchant 104 creates an order for the identified product using the customer information. If an order from the same customer 102 is already pending, the merchant 104 can add the identified product to the pending order. Once the merchant 104 places the order, it can send a message back to the information service 114 indicating that the order has been placed.

In subsequent steps not illustrated in the flowchart 1100, the customer 102 can log in to the information service web site 116, access her order history page, and follow a link to the merchant's order history and review page. At the merchant's order history and review page, the customer can modify or cancel any pending order and view placed orders.

C. Alternative Implementations

In one alternative implementation of this third specific embodiment, the information service 114 could send the customer's user ID along with the customer information to merchant 104 so that merchant 104 can easily consolidate 1-Click orders without attempting to match customer information.

In another implementation, the graphic 1010 could include a text entry box in which the customer 102 supplies a password. The password is sent along with the HTTP request 1120 to the information service and can be used as an extra element of security in authenticating the customer 102.

In another alternative implementation, the information service server 118 could direct the customer 102 to an order history and review page on the merchant's web site 106 after the customer clicks on the single click purchase graphic 1010. This feature could be implemented by redirecting the customer's web browser 109 back to the merchant web site 106 after the information service server 118 receives a response from a single click link. Sufficient information could be appended to the redirect URL using URL encoding to allow the merchant server 108 to identify the customer 102 and display the appropriate web page.

In still another alternative implementation, the merchant 104 could also deposit a cookie on the customer's computer 110. The merchant 104 could then use the cookie to allow the customer 102 to check an order history and review page without first logging into the information service 114. The cookie could also be used to provide a separate single click feature that does not require interaction with the information service 114.

In other implementations, the features of the present embodiment could be implemented using more comprehensive web tools such as Java and frames. These other implementations could provide additional features. For example, using frames, the single click graphic 1010 could be replaced with a frame. The Java programming language could also be used in conjunction with the frame to provide some interactive and/or processing capabilities to the single click purchase frame.

VI. Alternative Embodiments

In an alternative embodiment, any of the above embodiments could be modified to combine the user ID and password into a passcode. In another alternative embodiment, the information service 114, instead of the customer 102, could select and/or provide the user ID and/or password. In other embodiments, other forms of authentication, such as a key file or a talbage-response method, could replace the use of the user ID and passcode.

In further embodiments, the information service 114 could provide the customer's user ID and password to the merchant 104 in conjunction with providing the customer information. With this information, the merchant 104 could allow the customer 102 to login directly to the merchant web site 106, access account information and make purchases using her existing information service 114 user ID and password.

In an additional embodiment, the information service 114 can act as a payment intermediary in addition to providing customer information. In accordance with this embodiment, the information service 114 can charge the customer 102 and in turn the information service 114 can make payment to the merchant 104. The information service 114 can charge a commission to the customer 102 and/or the merchant 104 for using the payment intermediary service. The payment intermediary service can be combined with the information intermediary service such that the information service 114 provides customer information as well as serving as a payment intermediary. Alternatively, the information service 114 could act as a payment intermediary instead of providing customer information.

In still other alternative embodiments, various features of the above-described embodiments could be combined to provide other conveniences to the Internet shopper.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the method claims, reference characters are used for convenience of description only, and do not indicate a particular order for performing the method.

What is claimed is:

1. A computer-implemented method of enabling a user to order an item from a merchant site of a merchant, the method comprising:

registering the user and the merchant with a computer-implemented service that acts as a payment intermediary between users and merchants, said service comprising a server that operates in a first network domain that is separate from a network domain of the merchant site, said service being separate from the merchant site;

sending a cookie associated with said service and said first network domain to a user computing device of the user for storage thereon;

subsequently, receiving, with said server, a request generated by a browser running on the user computing device, said request including the cookie, said request generated by the browser in response to a link included in a web page of the merchant site;

responding to the request with said server by generating and returning a purchase object for display on the web page of the merchant site, said purchase object being selectable by the user to order the item from the merchant;

receiving, with said server, an order request message generated by said user computing device in response to user selection of the purchase object as displayed by the browser on the web page, said order request message representing an order placed by the user for said item; and in response to the order request message, charging the user for the item on behalf of the merchant, such that the user is charged by said service with said service acting as a payment intermediary between the user and the merchant;

wherein the method, including registering the user and the merchant, sending the cookie, receiving the request, responding to the request by generating and returning the purchase object, receiving the order request message, and charging the user on behalf of the merchant, is performed by said computer-implemented service.

2. The method of claim 1, further comprising communicating information regarding the order from said service to a computer system associated with the merchant to enable the merchant to fulfill the order.

3. The method of claim 2, wherein the information regarding the order comprises an identifier of the item and a shipping address of the user.

4. The method of claim 1, wherein the purchase object is a single-action purchase object that is selectable by the user to complete a purchase of the item.

5. The method of claim 1, wherein the single-action purchase object is a single-action purchase frame.

6. The method of claim 1, wherein registering the user and the merchant with the service comprises receiving information submitted by the user and the merchant via web forms of the service.

7. The method of claim 6, wherein the information submitted by the user comprises payment information of the user.

8. The method of claim 1, wherein generating the purchase object comprises personalizing the purchase object with a name of said user such that the user's name appears on the web page of the merchant site.

9. The method of claim 1, wherein generating the purchase object comprises generating a URL-encoded purchase link that includes an identifier of the item and an identifier of the merchant.

10. The method of claim 1, further comprising causing the merchant to be charged a commission for using the service to collect payment from the user.

11. A system that enables customers to order items from merchant sites, the system comprising:
a server system that hosts a service web site, said service web site providing functionality for customers to register with a service that acts as a payment intermediary between customers and merchant sites, said server system operating in a first network domain; and
a data repository that stores information regarding customers and merchants that are registered with the service;
said server system operative to:
cause a cookie associated with the service and said first network domain to be written to a customer computing device of a customer of the service;
subsequently, receive a request generated by a browser running on the customer computing device, said request including the cookie, said request generated by the browser in response to a link included in a web page of a merchant site that operates in a second network domain, said merchant site associated with a merchant, said merchant site being separate from the server system and service web site;
respond to the request by generating and returning an object for display on the web page of the merchant site, said object being selectable by the customer to order the item from the merchant;
receive an order message generated by said customer computing device in response to customer selection of the object as displayed by the browser on the web page of the merchant site, said order message representing an order placed by the customer for said item; and
in response to said order message, charge the customer for the order on behalf of the merchant, such that the service operates as a payment intermediary between the customer and the merchant.

12. The system of claim 11, wherein the server system is further operative to send information regarding the order to a computer system associated with the merchant site to enable the merchant to fulfill the order.

13. The system of claim 12, wherein the information regarding the order comprises an identifier of the item and a shipping address of the customer.

14. The system of claim 11, wherein the object is a single-action purchase object that is selectable by the customer to complete a purchase of the item.

15. The system of claim 11, wherein the service web site additionally provides functionality for merchants to register to use the service to conduct transactions with registered customers.

16. The system of claim 11, wherein the server system is operative to personalize the object with a name of said customer.

17. A system that enables customers to order items from merchants, the system comprising:
a server system that hosts a service that acts as a payment intermediary between customers and merchant systems, said server system operating in a first network domain; and
a data repository that stores information regarding customers and merchants that are registered with the service;
said server system operative to:
cause a customer identifier to be written to a customer computing device of a customer of the service, said customer identifier associated with the first network domain;
subsequently, receive a request generated by a client running on the customer computing device, said request including the customer identifier, said request generated by the client in response to a reference included in a document served by a merchant system that operates in a second network domain, said merchant system associated with a merchant, said merchant system being separate from said server system;
respond to the request by generating and returning an object for display in the document, said object being selectable by the customer to order the item from the merchant;
receive an order message generated by said customer computing device in response to customer selection of the object as displayed by the client in the document, said order message representing an order placed by the customer for said item; and
cause the customer to be charged for the order, and cause the merchant to be paid for said order, such that the service acts as a payment intermediary between the customer and the merchant.

18. The system of claim 17, wherein the document is a web page.

19. The system of claim 17, wherein the server system is additionally operative to send information regarding the order to the merchant to enable the merchant to fulfill the order, said information including an identifier of the item and a shipping address of the customer.

20. The system of claim 17, wherein the server system hosts a web site that provides functionality for (1) merchants to register online to use the service to collect payments from customers, and (2) customers to register online to use the service to make payments.

21. The system of claim 20, wherein the web site is operative to provide the customer with a page that displays a history of payments made by the customer to merchants via the service.

* * * * *